(12) United States Patent
Jin et al.

(10) Patent No.: US 7,847,438 B2
(45) Date of Patent: Dec. 7, 2010

(54) POWER TRANSMISSION DEVICE, ELECTRONIC INSTRUMENT, AND WAVEFORM MONITORING CIRCUIT

(75) Inventors: Mikimoto Jin, Chino (JP); Takahiro Kamijo, Fujimi-cho (JP); Kentaro Yoda, Chino (JP); Haruhiko Sogabe, Chino (JP); Kota Onishi, Nagoya (JP); Ken Iisaka, Chino (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 12/167,812

(22) Filed: Jul. 3, 2008

(65) Prior Publication Data

US 2009/0009006 A1 Jan. 8, 2009

(30) Foreign Application Priority Data

| Jul. 4, 2007 | (JP) | ............................. 2007-175874 |
| Apr. 28, 2008 | (JP) | ............................. 2008-117439 |

(51) Int. Cl.
*H02J 17/00* (2006.01)

(52) U.S. Cl. ..................................... 307/104
(58) Field of Classification Search .................. 307/104
See application file for complete search history.

(56) References Cited

U.S. PATENT DOCUMENTS

| 5,349,173 | A | * | 9/1994 | Scheckel et al. | ............. 235/492 |
| 5,949,155 | A | * | 9/1999 | Tamura et al. | .............. 307/107 |
| 6,040,986 | A | * | 3/2000 | Sakamoto et al. | ......... 363/21.02 |
| 6,108,216 | A | * | 8/2000 | Abe et al. | ..................... 363/17 |
| 6,665,804 | B1 | | 12/2003 | Minowa | |
| 6,697,272 | B2 | * | 2/2004 | Nanbu et al. | .................. 363/97 |
| 7,042,739 | B2 | * | 5/2006 | Nagai et al. | .............. 363/21.06 |

(Continued)

FOREIGN PATENT DOCUMENTS

JP        A-7-31064        1/1995

(Continued)

OTHER PUBLICATIONS

U.S. Appl. No. 12/163,266, filed Jun. 27, 2008 in the name of Iisaka et al.

(Continued)

*Primary Examiner*—Jared Fureman
*Assistant Examiner*—Adi Amrany
(74) *Attorney, Agent, or Firm*—Oliff & Berridge, PLC

(57) ABSTRACT

A power transmission device of a non-contact power transmission system includes a waveform monitoring circuit that generates and outputs a waveform-monitoring induced voltage signal based on a coil end signal of a primary coil, and a power transmission control device that controls a power transmission driver that drives the primary coil, the power transmission control device receiving the waveform-monitoring induced voltage signal and detecting a change in waveform of the induced voltage signal to detect a power-reception-side load state. The waveform monitoring circuit includes a first rectifier circuit having a limiter function, the first rectifier circuit including a current-limiting resistor provided between a coil end node where the coil end signal of the primary coil is generated and a monitoring node where the waveform-monitoring induced voltage signal is generated, performing a limiter operation that clamps the induced voltage signal at a high-potential-side power supply voltage, and subjecting the induced voltage signal to half-wave rectification.

17 Claims, 25 Drawing Sheets

U.S. PATENT DOCUMENTS

| | | | |
|---|---|---|---|
| 2002/0066793 A1 | 6/2002 | Hayashi | |
| 2005/0068019 A1 | 3/2005 | Nakamura et al. | |
| 2005/0162873 A1* | 7/2005 | Boswinkel | 363/20 |
| 2008/0197711 A1* | 8/2008 | Kato et al. | 307/104 |
| 2008/0231120 A1* | 9/2008 | Jin | 307/104 |
| 2009/0121837 A1 | 5/2009 | Kitayoshi et al. | |
| 2009/0133942 A1 | 5/2009 | Iisaka et al. | 178/43 |
| 2009/0174264 A1* | 7/2009 | Onishi et al. | 307/104 |
| 2009/0174364 A1* | 7/2009 | Onishi et al. | 320/108 |
| 2009/0175060 A1* | 7/2009 | Onishi et al. | 363/56.06 |
| 2009/0322280 A1* | 12/2009 | Kamijo et al. | 320/108 |
| 2010/0141051 A1* | 6/2010 | Vollaire | 307/151 |

FOREIGN PATENT DOCUMENTS

| | | |
|---|---|---|
| JP | A-10-260209 | 9/1998 |
| JP | A-11-341711 | 12/1999 |
| JP | A-2001-7745 | 1/2001 |
| JP | A-2001-352699 | 12/2001 |
| JP | A-2002-142356 | 5/2002 |
| JP | A-2002-221567 | 8/2002 |
| JP | A-2004-166449 | 6/2004 |
| JP | A-2005-110421 | 4/2005 |
| JP | A-2005-137040 | 5/2005 |
| JP | A-2006-60909 | 3/2006 |
| WO | WO 2007/010869 | 1/2007 |

OTHER PUBLICATIONS

U.S. Appl. No. 12/163,300, filed Jun. 27, 2008 in the name of Iisaka et al.

* cited by examiner

FIG. 14A LOW LOAD
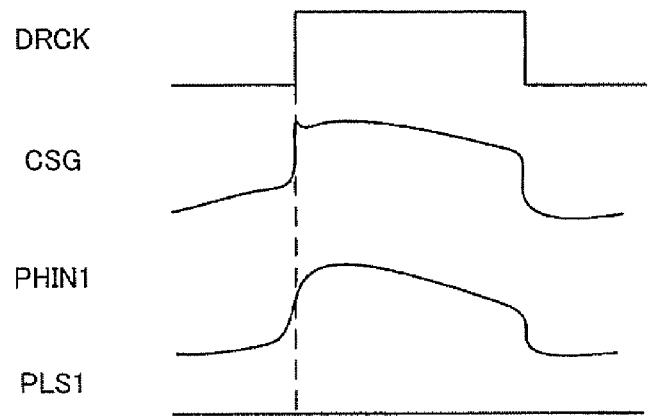
FIG. 14B MEDIUM LOAD
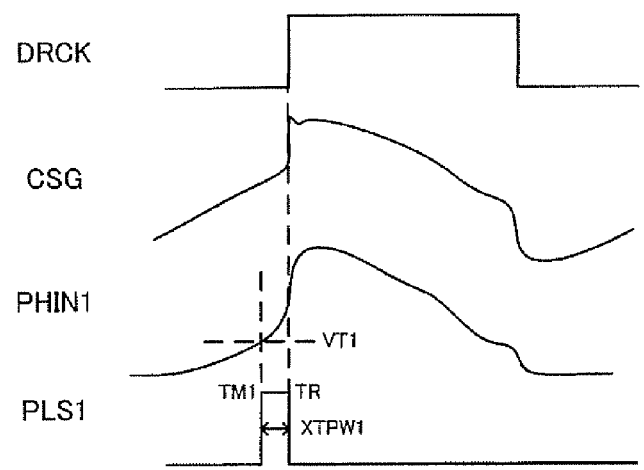
FIG. 14C HIGH LOAD
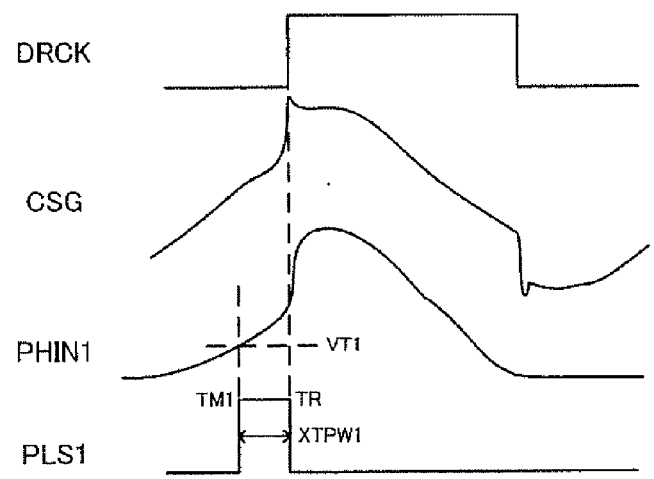

FIG. 15A NO-LOAD
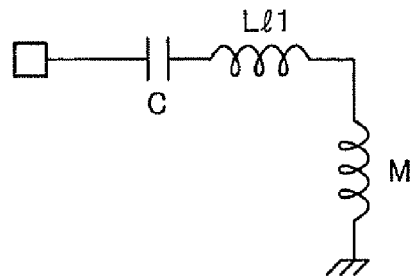
FIG. 15B LOAD-CONNECTED
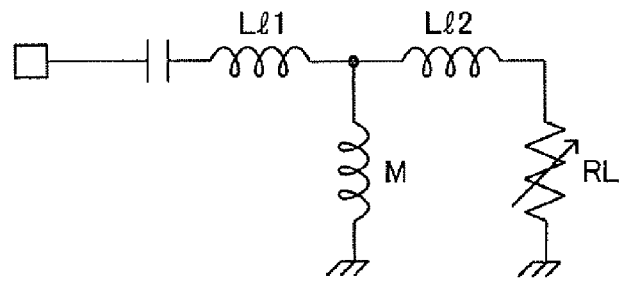
FIG. 15C
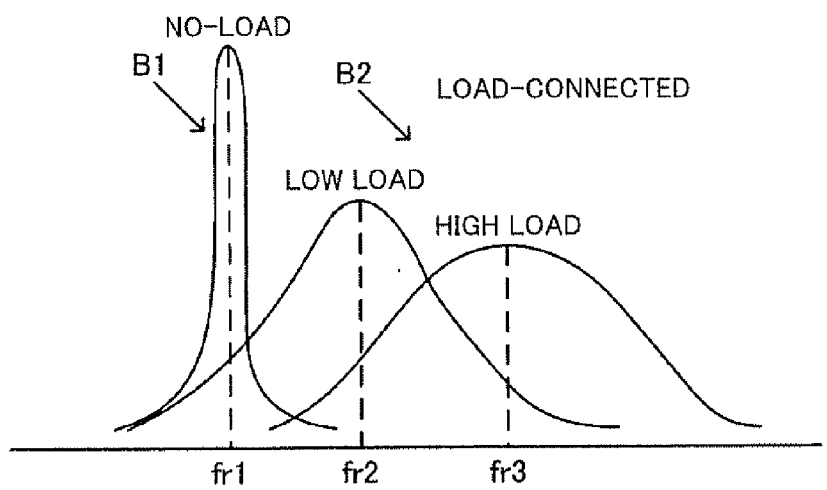

FIG. 19A  LOW LOAD
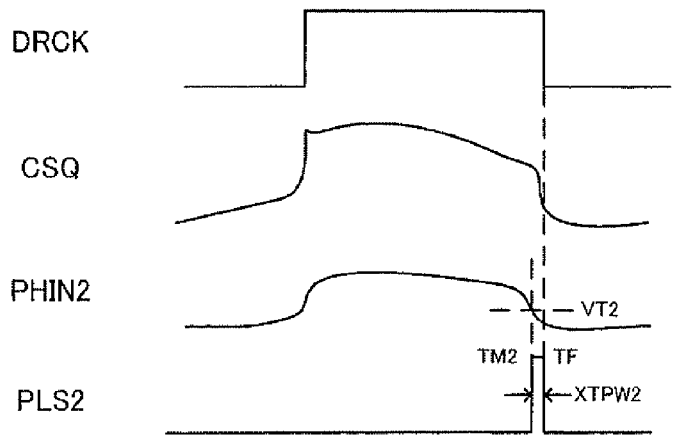
FIG. 19B  MEDIUM LOAD
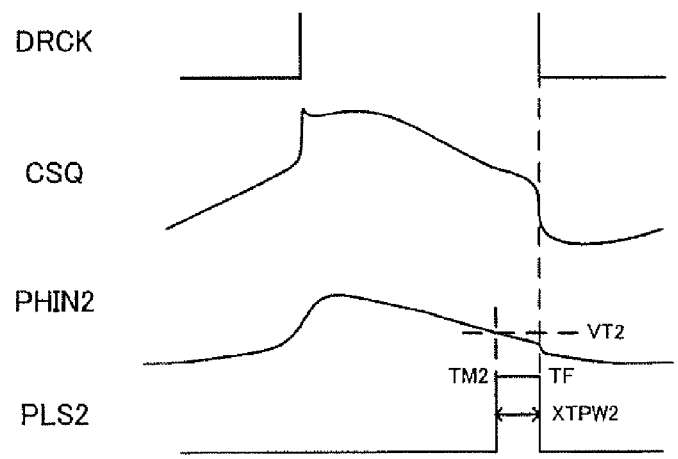
FIG. 19C  HIGH LOAD
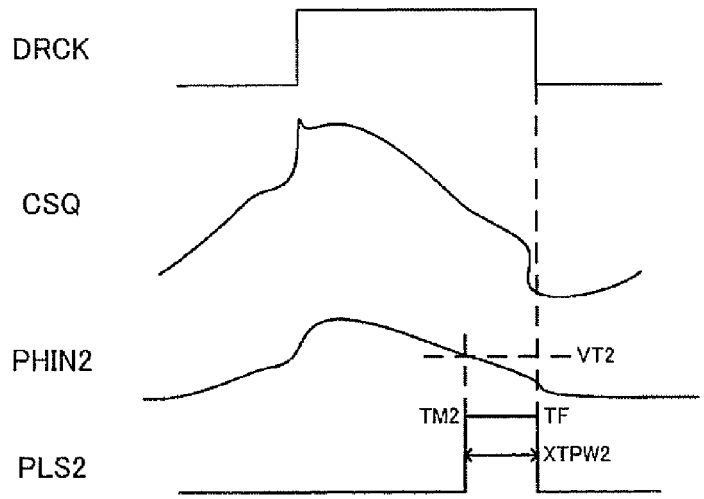

POWER TRANSMISSION DEVICE, ELECTRONIC INSTRUMENT, AND WAVEFORM MONITORING CIRCUIT

This application claims priority from Japanese Patent Application No. 2007-175874, filed in the Japanese Patent Office on Jul. 4, 2007 and Japanese Patent Application No. 2008-117439, filed in the Japanese Patent Office on Apr. 28, 2008, the entire discloses of which are hereby incorporated by reference in their entirety.

BACKGROUND OF THE INVENTION

The present invention relates to a power transmission device, an electronic instrument, a waveform monitoring circuit, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., telephone handset), and the like have been proposed.

As related-art non-contact power transmission technology, a power transmission device has been known which implements data transmission from a power reception device (secondary side) to a power transmission device (primary side) by means of load modulation (e.g., JP-A-2006-60909). The power transmission device detects a change in power-reception-side (secondary-side) load state due to foreign object insertion or data transmission by detecting the induced voltage in a primary coil using a comparator or the like.

The above-mentioned power transmission device generates an induced voltage signal input to a power transmission control device by means of voltage division using a resistor. Therefore, the waveform is reduced due to voltage division, whereby the load state detection accuracy cannot be improved to a satisfactory level.

SUMMARY

According to one aspect of the invention, there is provided a power transmission device included in a non-contact power transmission system that transmits power to a power reception device by electromagnetically coupling a primary coil and a secondary coil to transmit power to a load of the power reception device, the power transmission device comprising:

a waveform monitoring circuit that generates and outputs a waveform-monitoring induced voltage signal based on a coil end signal of the primary coil; and a power transmission control device that controls a power transmission driver that drives the primary coil, the power transmission control device receiving the waveform-monitoring induced voltage signal and detecting a waveform of the induced voltage signal to detect a power-reception-side load state, the waveform monitoring circuit including a first rectifier circuit having a limiter function, the first rectifier circuit including a first resistor that is a current-limiting resistor provided between a coil end node where the coil end signal of the primary coil is generated and a first monitoring node where a waveform-monitoring first induced voltage signal is generated, performing a limiter operation that clamps the first induced voltage signal at a high-potential-side power supply voltage, and performing a half-wave rectification of the first induced voltage signal.

According to another aspect of the invention, there is provided an electronic instrument comprising the above power transmission device.

According to another aspect of the invention, there is provided a waveform monitoring circuit provided in a power transmission device included in a non-contact power transmission system that transmits power to a power reception device by electromagnetically coupling a primary coil and a secondary coil to transmit power to a load of the power reception device, the waveform monitoring circuit comprising:

a first rectifier circuit having a limiter function, the first rectifier circuit including a first resistor that is a current-limiting resistor provided between a coil end node where a coil end signal of the primary coil is generated and a first monitoring node where a waveform-monitoring first induced voltage signal is generated, performing a limiter operation that clamps the first induced voltage signal at a high-potential-side power supply voltage, performing a half-wave rectification of the first induced voltage signal, and outputting the first induced voltage signal to a power transmission control device of the power transmission device; and a second rectifier circuit that includes a second resistor that is a current-limiting resistor provided between the coil end node and a second monitoring node where a waveform-monitoring second induced voltage signal is generated, a third resistor provided between the second monitoring node and a low-potential-side power supply node, and a third diode provided between the second monitoring node and the low-potential-side power supply node, a forward direction of the third diode being a direction from the low-potential-side power supply node to the second monitoring node, the second rectifier circuit outputting the second induced voltage signal to the power transmission control device.

BRIEF DESCRIPTION OF THE SEVERAL VIEWS OF THE DRAWING

FIGS. 14A to 14C show signal waveform measurement results illustrative of a first pulse width detection method.

FIG. 15A shows an equivalent circuit in a no-load state, FIG. 15B shows an equivalent circuit in a load-connected state, and FIG. 15C is a resonance characteristic diagram in a no-load state and a load-connected state.

FIGS. 19A to 19C show signal waveform measurement results illustrative of a second pulse width detection method.

DETAILED DESCRIPTION OF THE EMBODIMENT

Figure 1A:
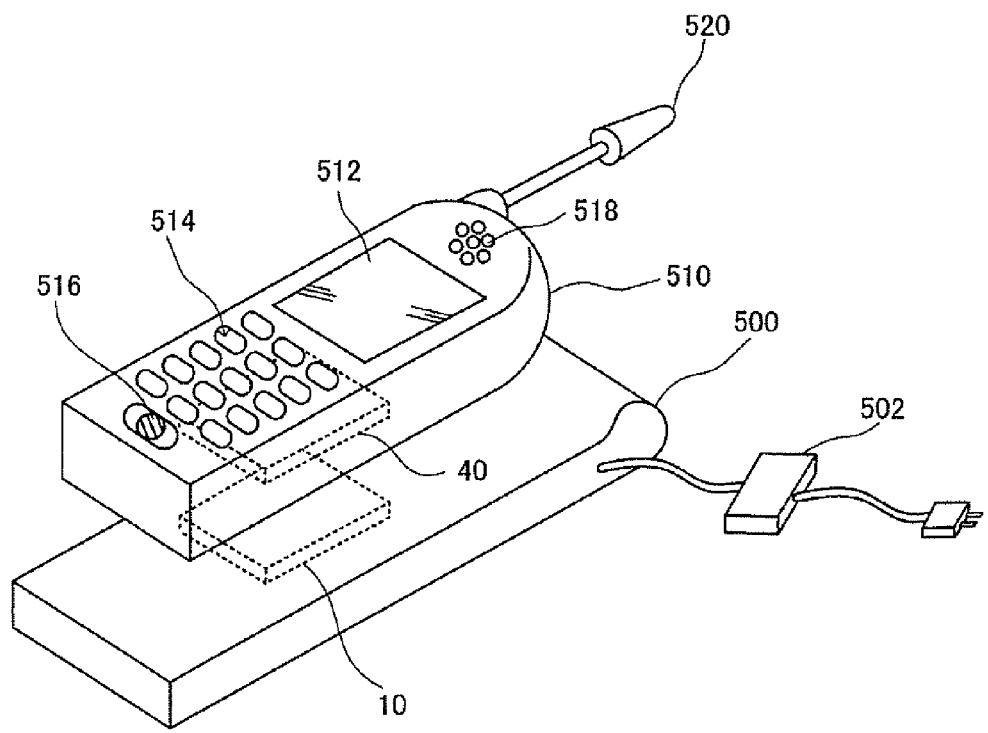
FIGS. 1A and 1B are views illustrative of non-contact power transmission.

Several aspects of the invention may provide a power transmission device including a waveform monitoring circuit suitable for a non-contact power transmission system, an electronic instrument, and the like.

According to one embodiment of the invention, there is provided a power transmission device included in a non-contact power transmission system that transmits power to a power reception device by electromagnetically coupling a primary coil and a secondary coil to transmit power to a load of the power reception device, the power transmission device comprising:

a waveform monitoring circuit that generates and outputs a waveform-monitoring induced voltage signal based on a coil end signal of the primary coil; and a power transmission control device that controls a power transmission driver that drives the primary coil, the power transmission control device receiving the waveform-monitoring induced voltage signal and detecting a waveform of the induced voltage signal to detect a power-reception-side load state, the waveform monitoring circuit including a first rectifier circuit having a limiter function, the first rectifier circuit including a first resistor that is a current-limiting resistor provided between a coil end node where the coil end signal of the primary coil is generated and a first monitoring node where a waveform-monitoring first induced voltage signal is generated, performing a limiter operation that clamps the first induced voltage signal at a high-potential-side power supply voltage, and performing a half-wave rectification of the first induced voltage signal.

According to this embodiment, the waveform monitoring circuit generates the waveform-monitoring induced voltage signal based on the coil end signal of the primary coil, and outputs the induced voltage signal to the power transmission control device. A situation in which an overcurrent from the coil end node flows into the power transmission control device can be prevented by the current control resistor provided in the first rectifier circuit of the waveform monitoring circuit. Since the first rectifier circuit of the waveform monitoring circuit clamps the induced voltage signal at the high-potential-side power supply voltage, a situation in which a voltage equal to or higher than the maximum rated voltage is applied to the power transmission control device can be prevented. Moreover, a situation in which a negative voltage is applied to the power transmission control device can be prevented by causing the first rectifier circuit to subject the induced voltage signal to half-wave rectification.

In the power transmission device according to this embodiment, the first rectifier circuit may include:

a first diode provided between the first monitoring node and a high-potential-side power supply node, a forward direction of the first diode being a direction from the first monitoring node to the high-potential-side power supply node; and a second diode provided between the first monitoring node and a low-potential-side power supply node, a forward direction of the second diode being a direction from the low-potential-side power supply node to the first monitoring node.

The limit operation of the first rectifier circuit can be implemented by providing the first diode, and half-wave rectification of the first rectifier circuit can be implemented by providing the second diode.

In the power transmission device according to this embodiment, the first rectifier circuit may include a Zener diode provided between the first monitoring node and a low-potential-side power supply node, a forward direction of the Zener diode being a direction from the low-potential-side power supply node to the first monitoring node.

This makes it possible to implement the limit operation without providing the first diode.

In the power transmission device according to this embodiment, the first rectifier circuit may include:

a first diode provided between the first monitoring node and a high-potential-side power supply node, a forward direction of the first diode being a direction from the first monitoring node to the high-potential-side power supply node;

a second diode provided between the first monitoring node and a low-potential-side power supply node, a forward direction of the second diode being a direction from the low-potential-side power supply node to the first monitoring node; and a first capacitor provided between a low-potential-side resistor end node and the coil end node, the low-potential-side resistor end node being provided between the first resistor and the second diode.

According to this configuration, a DC offset component of the coil end signal can be removed by capacitive coupling of the first capacitor, whereby an offset-free state of the coil end signal can be implemented.

In the power transmission device according to this embodiment, the power transmission control device may include a waveform detection circuit that detects a change in waveform of the induced voltage signal of the primary coil;

the waveform detection circuit may include:

a first waveform detection circuit that detects a waveform of the first induced voltage signal of the primary coil; and a second waveform detection circuit that detects a waveform of a second induced voltage signal of the primary coil; and the waveform monitoring circuit may include:

the first rectifier circuit that outputs the waveform-monitoring first induced voltage signal to the first waveform detection circuit through the first monitoring node; and a second rectifier circuit that outputs the waveform-monitoring second induced voltage signal to the second waveform detection circuit through a second monitoring node.

According to this configuration, the first and second induced voltage signals suitable for the first and second waveform detection circuits can be generated using the first and second rectifier circuits.

In the power transmission device according to this embodiment, the second rectifier circuit may include:

a second resistor provided between the coil end node and the second monitoring node;

a third resistor provided between the second monitoring node and a low-potential-side power supply node; and a third diode provided between the second monitoring node and the low-potential-side power supply node, a forward direction of the third diode being a direction from the low-potential-side power supply node to the second monitoring node.

This enables the second induced voltage signal obtained by reducing the waveform of the coil end signal to be output to the power transmission control device.

In the power transmission device according to this embodiment, the power transmission control device may include:

a drive clock signal generation circuit that generates and outputs a drive clock signal that specifies a drive frequency of the primary coil;

a driver control circuit that generates a driver control signal based on the drive clock signal, and outputs the driver control signal to the power transmission driver that drives the primary coil; and a control circuit that detects the power-reception-side load state based on a detection result of the waveform detection circuit;

the first waveform detection circuit of the waveform detection circuit may include a first pulse width detection circuit, when a timing at which the first induced voltage signal that has changed from a low-potential-side power supply voltage exceeds a first threshold voltage is referred to as a first timing, the first pulse width detection circuit measuring a first pulse width period to detect first pulse width information, the first pulse width period being a period between a first edge timing of the drive clock signal and the first timing; and the control circuit may detect the power-reception-side load state based on the first pulse width information.

According to this configuration, the first pulse width period (i.e., the period between the first edge timing (e.g., falling or rising edge timing) of the drive clock signal and the first timing) is measured and detected as the first pulse width information. The power-reception-side load state is detected based on the detected first pulse width information. Therefore, a change in power-reception-side load can be stably detected without employing a method that separately detects voltage and current and makes a determination based on the phase difference. Therefore, a change in secondary-side load can be appropriately detected by a simple configuration. According to the invention, since the first timing is set to be a timing at which the first induced voltage signal that has changed from the low-potential-side power supply voltage exceeds the first threshold voltage, the pulse width can be detected with a small variation even if the power supply voltage or the like has changed.

In the power transmission device according to this embodiment, the first waveform detection circuit may include a first waveform adjusting circuit that adjusts a waveform of the first induced voltage signal and outputs a first waveform-adjusted signal; and the first pulse width detection circuit may measure the first pulse width period based on the first waveform-adjusted signal and the drive clock signal.

This makes it possible to digitally measure the first pulse width period using the drive clock signal and a signal of which the waveform has been adjusted by the first waveform adjusting circuit.

In the power transmission device according to this embodiment, the first pulse width detection circuit may include a first counter that increments or decrements a count value in the first pulse width period and measures the first pulse width period based on resulting count value of the first counter.

This makes it possible to more accurately measure the first pulse width period digitally using the first counter.

In the power transmission device according to this embodiment, the control circuit may perform primary foreign object detection based on the first pulse width information, the primary foreign object detection being foreign object detection before normal power transmission starts.

According to this configuration, primary foreign object detection can be implemented in a no-load state before normal power transmission starts, for example.

In the power transmission device according to this embodiment, the second waveform detection circuit may include a second pulse width detection circuit that measures a second pulse width period and detects second pulse width information, the second pulse width period being a period between a second edge timing of the drive clock signal and a second timing, the second timing being a timing when the second induced voltage signal of the primary coil that has changed from a high-potential-side power supply voltage falls below a second threshold voltage; and the control circuit may perform secondary foreign object detection based on the second pulse width information, the secondary foreign object detection being foreign object detection after normal power transmission has started.

According to this configuration, since a foreign object can be detected by a different standard before and after normal power transmission, foreign object detection accuracy and stability can be improved.

In the power transmission device according to this embodiment, the second waveform detection circuit may include a second waveform adjusting circuit that adjusts a waveform of the second induced voltage signal and outputs a second waveform-adjusted signal; and the second pulse width detection circuit may measure the second pulse width period based on the second waveform-adjusted signal and the drive clock signal.

This makes it possible to digitally measure the second pulse width period using the drive clock signal and a signal of which the waveform has been adjusted by the second waveform adjusting circuit.

In the power transmission device according to this embodiment, the second pulse width detection circuit may include a second counter that increments or decrements a count value in the second pulse width period and measures the second pulse width period based on resulting count value of the second counter.

This makes it possible to more accurately measure the second pulse width period digitally using the second counter.

In the power transmission control device according to this embodiment, the first waveform detection circuit may include a first waveform adjusting circuit that adjusts a waveform of the first induced voltage signal and outputs a first waveform-adjusted signal to the first pulse width detection circuit; and the second waveform adjusting circuit may adjust a waveform of the second induced voltage signal differing from the first induced voltage signal, and outputting the second waveform-adjusted signal to the second pulse width detection circuit.

According to this configuration, the pulse width can be detected using the first and second induced voltage signals that differ in signal state between a first method that utilizes the first waveform adjusting circuit and the first pulse width detection circuit, and a second method that utilizes the second waveform adjusting circuit and the second pulse width detection circuit. Therefore, pulse width detection accuracy and stability can be improved.

In the power transmission device according to this embodiment, the power transmission control device may include a waveform detection circuit that detects a change in waveform of the induced voltage signal of the primary coil;

the waveform detection circuit may include:

a first waveform detection circuit that detects a waveform of the first induced voltage signal of the primary coil; and a second waveform detection circuit that detects a waveform of a second induced voltage signal of the primary coil;

the waveform monitoring circuit may include:

the first rectifier circuit that outputs the waveform-monitoring first induced voltage signal to the first waveform detection circuit through the first monitoring node; and a second rectifier circuit that outputs the waveform-monitoring second induced voltage signal to the second waveform detection circuit through a second monitoring node;

the first rectifier circuit may include:

a first diode provided between the first monitoring node and a high-potential-side power supply node, a forward direction of the first diode being a direction from the first monitoring node to the high-potential-side power supply node;

a second diode provided between the first monitoring node and a low-potential-side power supply node, a forward direction of the second diode being a direction from the low-potential-side power supply node to the first monitoring node; and a first capacitor provided between a low-potential-side resistor end node and the coil end node, the low-potential-side resistor end node being provided between the first resistor and the second diode; and the second rectifier circuit may include:

a third diode provided between the second monitoring node and a high-potential-side power supply node, a forward direction of the third diode being a direction from the second monitoring node to the high-potential-side power supply node;

a fourth diode provided between the second monitoring node and a low-potential-side power supply node, a forward direction of the fourth diode being a direction from the low-potential-side power supply node to the second monitoring node;

a second resistor provided between the third diode and the second monitoring node; a third resistor provided between the second monitoring node and the low-potential-side power supply node; and a second capacitor provided between a high-potential-side resistor end node and the coil end node, the high-potential-side resistor end node being provided between the third diode and the second resistor.

According to this configuration, a DC offset of the coil end signal can be removed by providing the first and second capacitors, whereby an offset-free state of the coil end signal can be implemented.

In the power transmission device according to this embodiment, the power transmission control device may include:

a drive clock signal generation circuit that generates and outputs a drive clock signal that specifies a drive frequency of the primary coil;

a driver control circuit that generates a driver control signal based on the drive clock signal, and outputs the driver control signal to the power transmission driver that drives the primary coil; and a control circuit that detects the power-reception-side load state based on a detection result of the waveform detection circuit; and the first waveform detection circuit of the waveform detection circuit may include a first pulse width detection circuit, when a timing at which the first induced voltage signal that has changed from a low-potential-side power supply voltage exceeds a first threshold voltage is referred to as a first timing, the first pulse width detection circuit measuring a first pulse width period to detect first pulse width information, the first pulse width period being a period between a first edge timing of the drive clock signal and the first timing.

According to this configuration, a change in power-reception-side load can be stably detected without employing a method that separately detects voltage and current and makes a determination based on the phase difference. Therefore, a change in secondary-side load can be appropriately detected by a simple configuration. According to the invention, since the first timing is set to be a timing at which the first induced voltage signal that has changed from the low-potential-side power supply voltage exceeds the first threshold voltage, the pulse width can be detected with a small variation even if the power supply voltage or the like has changed.

In the power transmission device according to this embodiment, the second waveform detection circuit may include a second pulse width detection circuit that measures a second pulse width period and detects second pulse width information, the second pulse width period being a period between a second edge timing of the drive clock signal and a second timing, the second timing being a timing when the second induced voltage signal of the primary coil that has changed from a high-potential-side power supply voltage falls below a second threshold voltage.

This makes it possible to reduce the waveform of the coil end signal and compare the voltage level of the second induced voltage signal obtained by reducing the waveform of the coil end signal with the second threshold voltage to obtain the second pulse width information.

According to another embodiment of the invention, there is provided an electronic instrument comprising one of the above power transmission devices.

According to another embodiment of the invention, there is provided a waveform monitoring circuit provided in a power transmission device included in a non-contact power transmission system that transmits power to a power reception device by electromagnetically coupling a primary coil and a secondary coil to transmit power to a load of the power reception device, the waveform monitoring circuit comprising:

a first rectifier circuit having a limiter function, the first rectifier circuit including a first resistor that is a current-limiting resistor provided between a coil end node where a coil end signal of the primary coil is generated and a first monitoring node where a waveform-monitoring first induced voltage signal is generated, performing a limiter operation that clamps the first induced voltage signal at a high-potential-side power supply voltage, performing a half-wave rectification of the first induced voltage signal, and outputting the first induced voltage signal to a power transmission control device of the power transmission device; and a second rectifier circuit that includes a second resistor that is a current-limiting resistor provided between the coil end node and a second monitoring node where a waveform-monitoring second induced voltage signal is generated, a third resistor provided between the second monitoring node and a low-potential-side power supply node, and a third diode provided between the second monitoring node and the low-potential-side power supply node, a forward direction of the third diode being a direction from the low-potential-side power supply node to the second monitoring node, the second rectifier circuit outputting the second induced voltage signal to the power transmission control device.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Electronic Instrument

FIG. 1A shows examples of an electronic instrument to which a non-contact power transmission method according to one embodiment of the invention is applied. A charger 500 (cradle) (i.e., electronic instrument) includes a power transmission device 10. A portable telephone 510 (i.e., electronic instrument) includes a power reception device 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, a power-assisted bicycle, and an IC card.

Figure 1B:
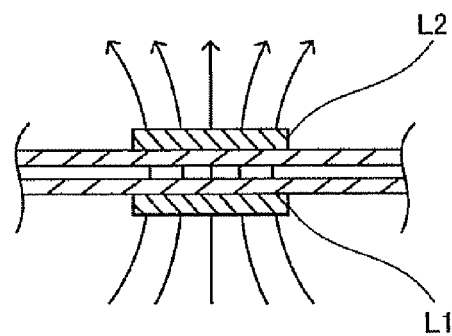

As schematically shown in FIG. 1B, power transmission from the power transmission device 10 to the power reception device 40 is implemented by electromagnetically coupling a primary coil L1 (power-transmission-side coil) provided in the power transmission device 10 and a secondary coil L2 (power-reception-side coil) provided in the power reception device 40 to form a power transmission transformer. This enables non-contact power transmission.

2. Power Transmission Device and Power Reception Device

Figure 2:
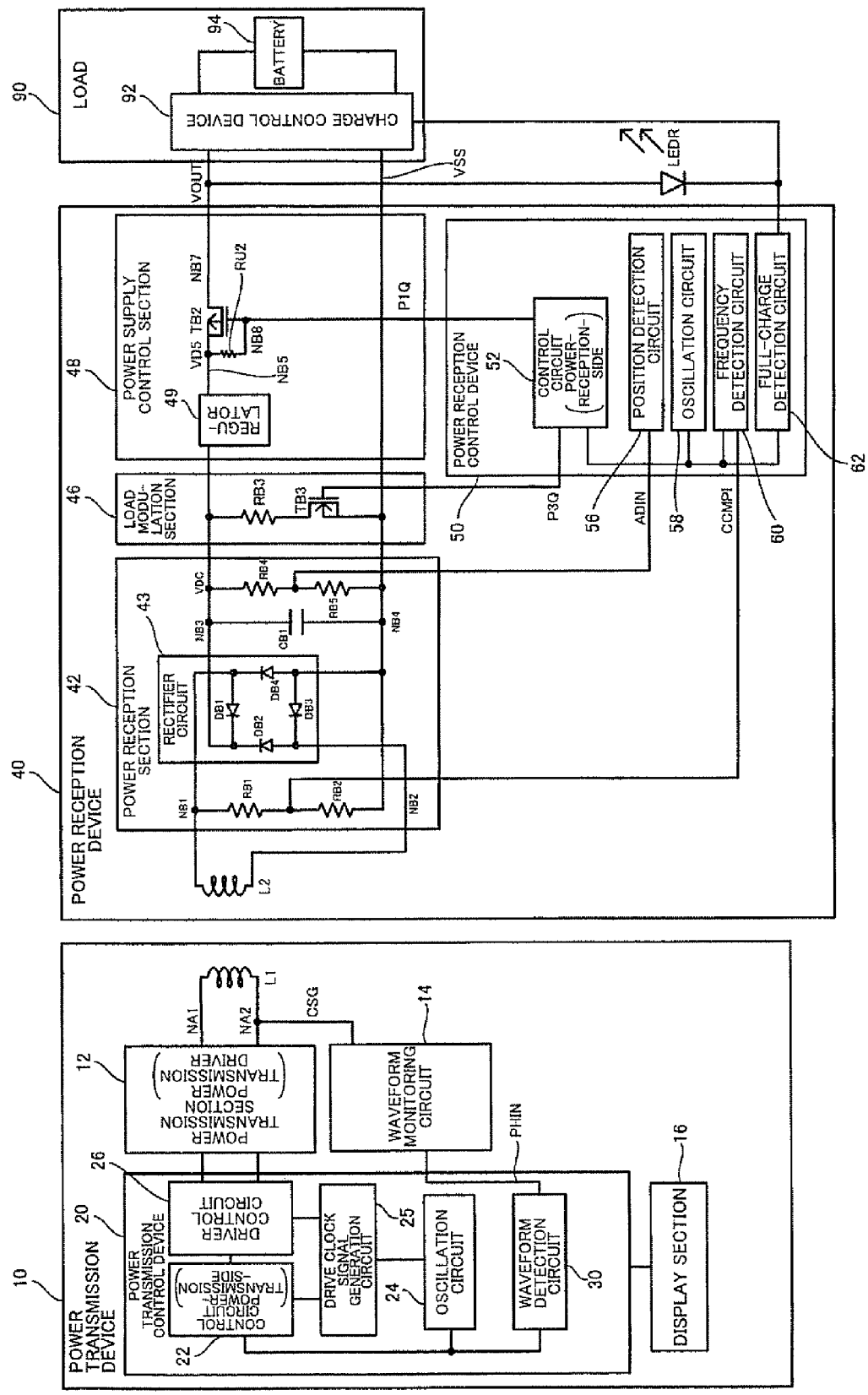
FIG. 2 shows a configuration example of a power transmission device, a power transmission control device, a power reception device, and a power reception control device according to one embodiment of the invention.

FIG. 2 shows a configuration example of the power transmission device 10, a power transmission control device 20, the power reception device 40, and a power reception control device 50 according to this embodiment. A power-transmission-side electronic instrument such as the charger 500 shown in FIG. 1A includes the power transmission device 10 shown in FIG. 2. A power-reception-side electronic instrument such as the portable telephone 510 may include the power reception device 40 and a load 90 (actual load). The configuration shown in FIG. 2 implements a non-contact power transmission (contactless power transmission) system that transmits power from the power transmission device 10 to the power reception device 40 by electromagnetically coupling the primary coil L1 and the secondary coil L2 (e.g., planar coil), and supplies power (voltage VOUT) to the load 90 from a voltage output node NB7 of the power reception device 40.

The power transmission device 10 (power transmission module or primary module) may include the primary coil L1, a power transmission section 12, a waveform monitoring circuit 14, a display section 16, and the power transmission control device 20. The power transmission device 10 and the power transmission control device 20 are not limited to the configuration shown in FIG. 2. Various modifications may be made such as omitting some of the elements (e.g., display section or waveform monitoring circuit), adding other elements, or changing the connection relationship.

Figure 3A:
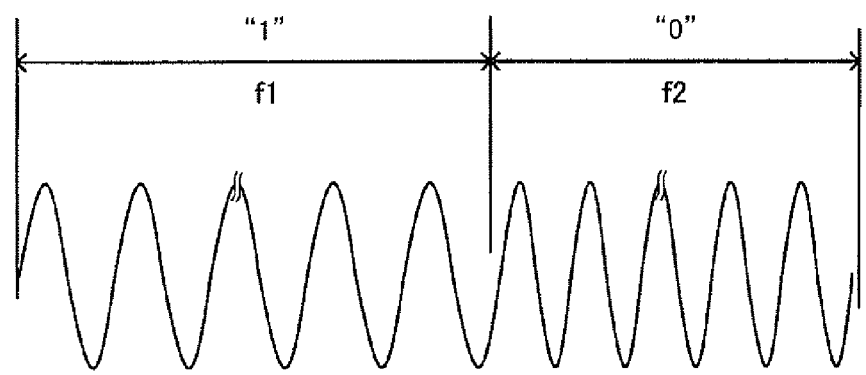
FIG. 3A is a view illustrative of data transfer by means of frequency modulation.

The power transmission section 12 generates an alternating-current voltage at a given frequency during power transmission, and generates an alternating-current voltage at a frequency that differs depending on data during data transfer. The power transmission section 12 supplies the generated alternating-current voltage to the primary coil L1. As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example. The power transmission section 12 may include a first power transmission driver that drives one end of the primary coil L1, a second power transmission driver that drives the other end of the primary coil L1, and at least one capacitor that forms a resonant circuit together with the primary coil L1.

Each of the first and second power transmission drivers included in the power transmission section 12 is an inverter circuit (buffer circuit) that includes a power MOS transistor, for example, and is controlled by a driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B. When power transmission is unnecessary, the charger 500 and the portable telephone 510 are physically separated so that a magnetic flux of the primary coil L1 does not pass through the secondary coil L2.

The waveform monitoring circuit 14 (rectifier circuit or waveform adjusting circuit) generates a waveform-monitoring induced voltage signal PHIN based on a coil end signal CSG of the primary coil L1. For example, the coil end signal CSG (induced voltage signal) of the primary coil L1 may exceed the maximum rated voltage of an IC of the power transmission control device 20, or may be set at a negative voltage. The waveform monitoring circuit 14 receives the coil end signal CSG, generates a waveform-monitoring induced voltage signal PHIN of which the waveform can be detected by a waveform detection circuit 30 of the power transmission control device 20, and outputs the induced voltage signal PHIN to a waveform-monitoring terminal of the power transmission control device 20, for example. The detail of the waveform monitoring circuit 14 is described later.

The display section 16 displays the state (e.g., power transmission or ID authentication) of the non-contact power transmission system using a color, an image, or the like. The display section 16 is implemented by an LED, an LCD, or the like.

The power transmission control device 20 controls the power transmission device 10. The power transmission control device 20 may be implemented by an integrated circuit device (IC) or the like. The power transmission control device 20 may include a (power-transmission-side) control circuit 22, an oscillation circuit 24, a drive clock signal generation circuit 25, a driver control circuit 26, and the waveform detection circuit 30. Note that modifications may be made such as omitting some of the elements or adding other elements.

The power-transmission-side control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load state detection (e.g., data detection, foreign object detection, and removal detection), frequency modulation, and the like.

The oscillation circuit 24 includes a crystal oscillation circuit, for example. The oscillation circuit 24 generates a primary-side clock signal. The drive clock signal generation circuit 25 generates a drive clock signal that specifies a drive frequency. The driver control circuit 26 generates a control signal at a desired frequency based on the drive clock signal, a frequency setting signal from the control circuit 22, and the like, and outputs the generated control signal to the first and second power transmission drivers of the power transmission section 12 to control the first and second power transmission drivers.

The waveform detection circuit 30 detects a change in waveform of the induced voltage signal PHIN of the primary coil L1. For example, when the load state (load current) of the power-reception-side instrument (secondary-side instrument) has changed, the waveform of the induced voltage signal PHIN changes. The waveform detection circuit 30 detects such a change in waveform, and outputs the detection result (detection result information) to the control circuit 22.

Specifically, the waveform detection circuit 30 adjusts the waveform of the induced voltage signal PHIN, and generates a waveform-adjusted signal. For example, the waveform detection circuit 30 generates a square wave (rectangular wave) waveform-adjusted signal that becomes active (e.g., H level) when the induced voltage signal PHIN has exceeded a given threshold voltage. The waveform detection circuit 30 detects pulse width information (pulse width period) relating to the waveform-adjusted signal based on the waveform-adjusted signal and the drive clock signal. Specifically, the waveform detection circuit 30 receives the waveform-adjusted signal and the drive clock signal from the drive clock signal generation circuit 25, and detects the pulse width information relating to the waveform-adjusted signal to detect pulse width information relating to the induced voltage signal PHIN.

The control circuit 22 detects the load state (change in load or degree of load) of the power-reception-side instrument (power reception device 40) based on the detection result of the waveform detection circuit 30. Specifically, the control circuit 22 detects the power-reception-side load state based on the pulse width information detected by the waveform detection circuit 30 (pulse width detection circuit), and performs data (load) detection, foreign object (metal) detection, removal (detachment) detection, and the like. The pulse width period that is the pulse width information relating to the induced voltage signal changes corresponding to the power-reception-side load. The control circuit 22 detects a change in the power-reception-side load based on the pulse width period (i.e., a count value obtained by measuring the pulse width period). Therefore, when a load modulation section 46 of the power reception device 40 has transmitted data by means of load modulation (see FIG. 3B), the transmitted data can be detected.

The power reception device 40 (power reception module or secondary module) may include the secondary coil L2, the power reception section 42, the load modulation section 46, a power supply control section 48, and the power reception control device 50. Note that the power reception device 40 and the power reception control device 50 are not limited to the configuration shown in FIG. 2. Various modifications may be made such as omitting some of the elements, adding other elements, or chancing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3

(direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

Figure 3B:
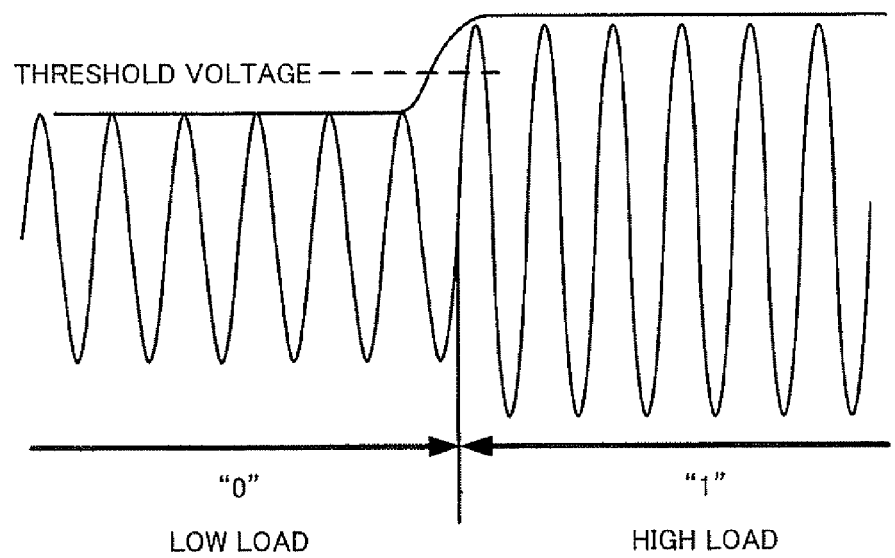
FIG. 3B is a view illustrative of data transfer by means of load modulation.

The load modulation section 46 performs a load modulation process. Specifically, when the power reception device 40 transmits desired data to the power transmission device 10, the load modulation section 46 variably changes the load of the load modulation section 46 (secondary-side instrument) corresponding to transmission data to chance the signal waveform of the induced voltage in the primary coil L1 as shown in FIG. 3B. The load modulation section 46 includes a resistor RB3 and a transistor TB3 (N-type CMOS transistor) provided in series between the nodes NB3 and NB4. The transistor TB3 is ON/OFF-controlled based on a signal P3Q from a control circuit 52 of the power reception control device 50. When the load modulation section 46 performs load modulation by ON/OFF-controlling the transistor TB3, a transistor TB2 of the power supply control section 48 is turned OFF so that the load 90 is electrically disconnected from the power reception device 40.

For example, when reducing the secondary-side load (high impedance) in order to transmit data "0" (see FIG. 3B), the signal P3Q is set at the L level so that the transistor TB3 is turned OFF. As a results the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls the amount of power supplied to the load 90. A regulator 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

The transistor TB2 (P-type CMOS transistor) is controlled based on a signal P1Q from the control circuit 52 of the power reception control device 50. Specifically, the transistor TB2 is turned ON when normal power transmission is performed after ID authentication has been completed (established), and is turned OFF during load modulation or the like.

The power reception control device 50 controls the power reception device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-reception-side) control circuit 52, the position detection circuit 56, an oscillation circuit 58, the frequency detection circuit 60, and a full-charge detection circuit 62.

The control circuit 52 (control section) controls the power reception device 40 and the power reception control device 50. The control circuit 52 may be implemented by a gate array, a microcomputer, or the like. Specifically, the control circuit 22 performs sequence control and a determination process necessary for ID authentication, position detection, frequency detection, load modulation, full-charge detection, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator or determines the level of the signal ADIN by A/D conversion, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmission device 10 is "1" or "0", as shown in FIG. 3A.

The full-charge detection circuit 62 (charge detection circuit) is a circuit that detects whether or not a battery 94 (secondary battery) of the load 90 has been fully charged (charged).

The load 90 may include a charge control device 92 that controls charging of the battery 94 and the like. The charge control device 92 (charge control IC) may be implemented by an integrated circuit device or the like. The battery 94 may be provided with the function of the charge control device 92 (e.g., smart battery).

Figure 4:
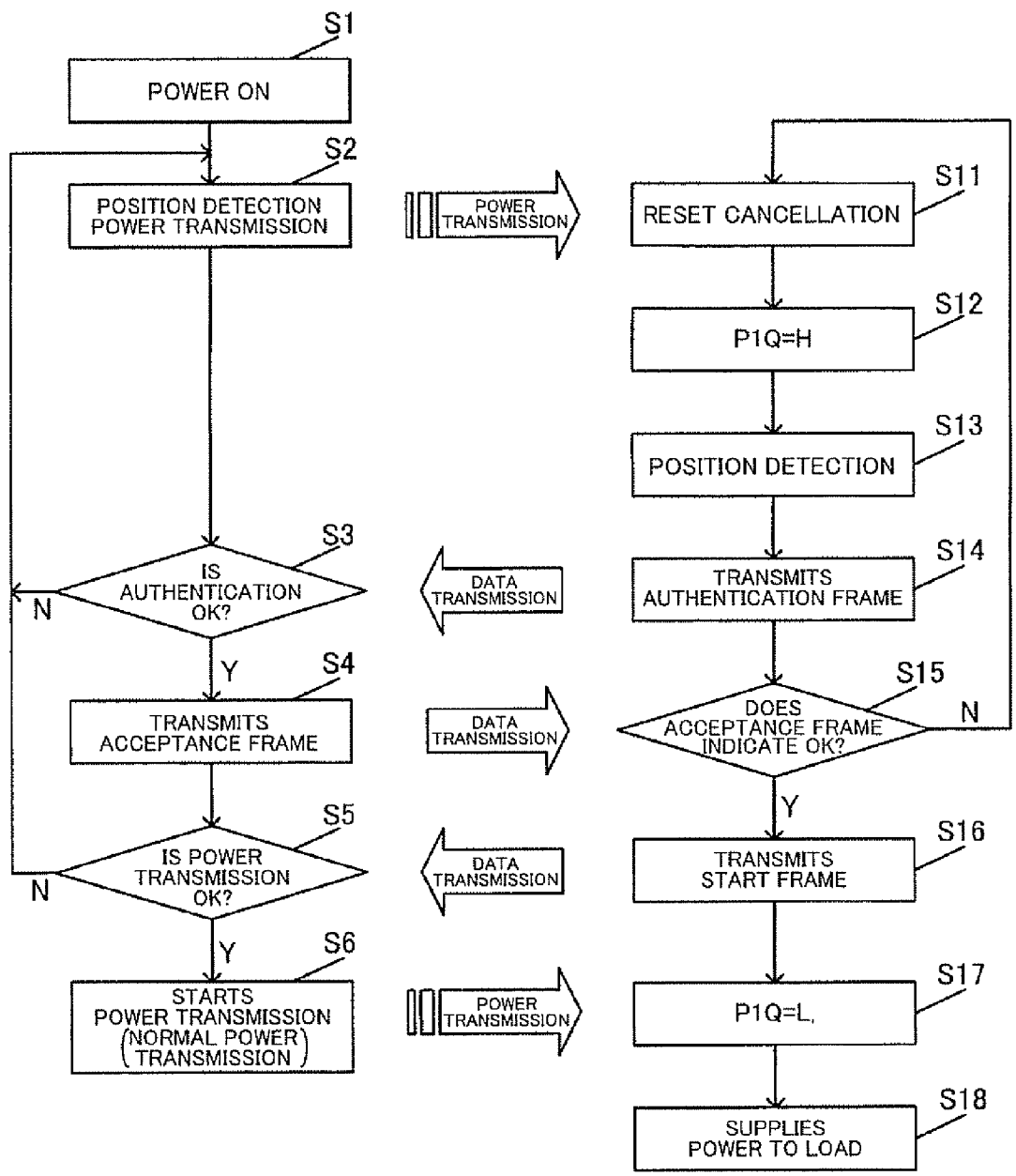
FIG. 4 is a flowchart illustrative of an outline of a power-transmission-side operation and a power-reception-side operation.

An outline of the power-transmission-side operation and the power-reception-side operation is described below using a flowchart shown in FIG. 4. When power has been supplied to the power-transmission-side instrument (step S1), the power-transmission-side instrument performs temporary power transmission for position detection (step S2). The power-reception-side power supply voltage rises due to power transmission so that the reset state of the power reception control device 50 is canceled (step S11). The power-reception-side instrument then sets the signal P1Q at the H level (step S12). This causes the transistor TB2 to be turned OFF so that the load 90 is electrically disconnected from the power reception device 40.

The power-reception-side instrument then determines whether or not the positional relationship between the primary coil L1 and the secondary coil L2 is appropriate using the position detection circuit 56 (step S13). When the power-reception-side instrument has determined that the positional relationship between the primary coil L1 and the secondary coil L2 is appropriate, the power-reception-side instrument starts an ID authentication process and transmits an authentication frame to the power-transmission-side instrument (step S14). Specifically, the power-reception-side instrument transmits data relating to the authentication frame by means of load modulation described with reference to FIG. 3B.

When the power-transmission-side instrument has received the authentication frame, the power-transmission-side instrument performs the ID determination process or the like (step S3). When the power-transmission-side instrument accepts the ID authentication, the power-transmission-side instrument transmits an acceptance frame to the power-reception-side instrument (step S4). Specifically, the power-transmission-side instrument transmits data by means of frequency modulation described with reference to FIG. 3A.

The power-reception-side instrument receives the acceptance frame. When the acceptance frame indicates OK, the power-reception-side instrument transmits a start frame for starting non-contact power transmission to the power-transmission-side instrument (steps S15 and S16). The power-transmission-side instrument receives the start frame. When the start frame indicates OK, the power-transmission-side instrument starts normal power transmission (steps S5 and S6). The power-reception-side instrument sets the signal P1Q at the L level (step S17). This causes the transistor TB2 to be turned ON so that power can be transmitted to the load 90. Power is then supplied to the load (i.e., the voltage VOUT is output to the load) (step S18).

3. Waveform Monitoring Circuit

3.1 First Configuration Example

Figure 5:
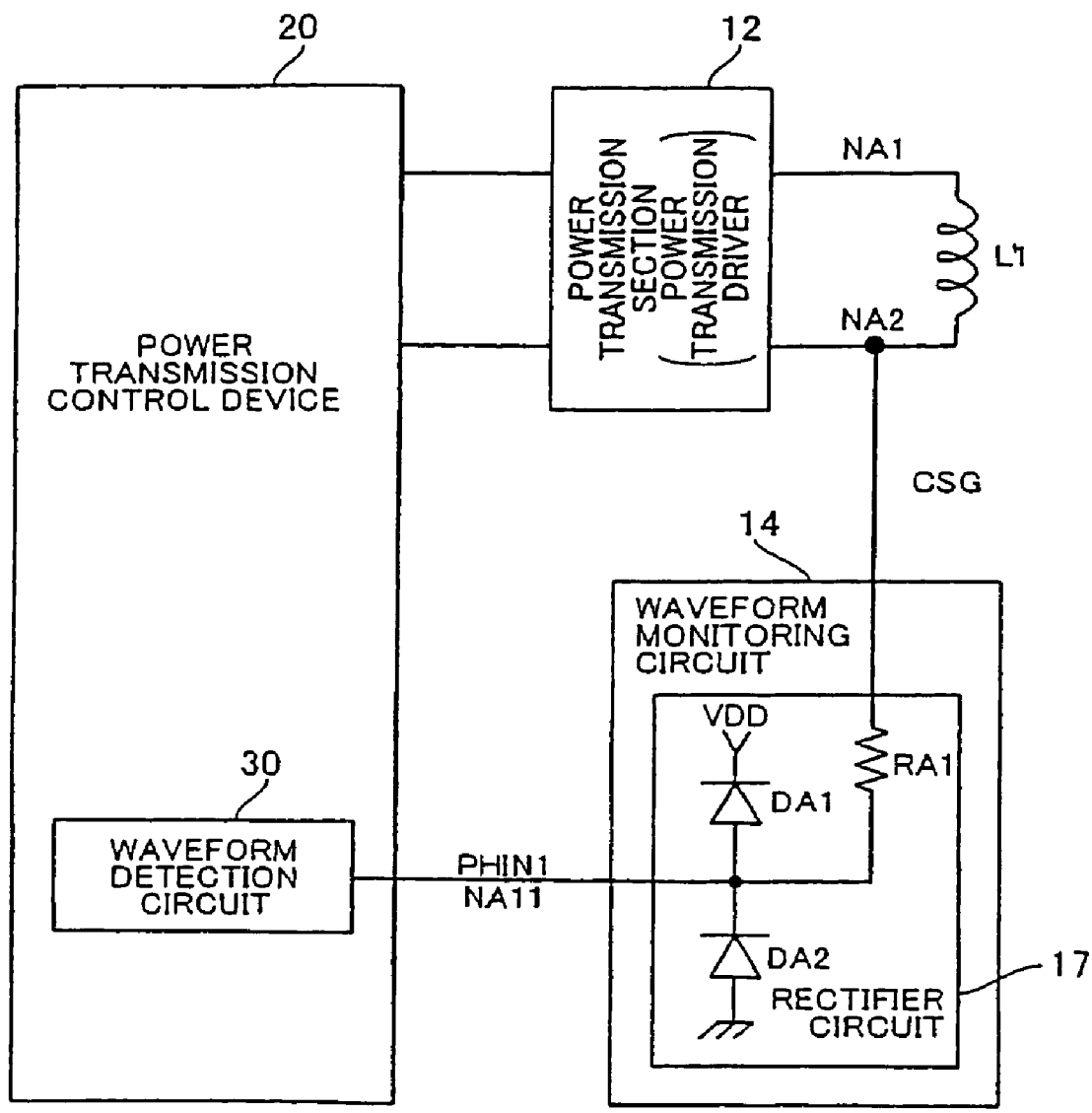
FIG. 5 shows a first configuration example of a waveform monitoring circuit according to one embodiment of the invention.

FIG. 5 shows a first configuration example of the waveform monitoring circuit 14 according to this embodiment. In FIG. 5, the power transmission control device 20 controls the power transmission drivers (first and second power transmission drivers) of the power transmission section 12 that drives the primary coil L1. The power transmission control device 20 receives a waveform-monitoring induced voltage signal PHIN1 from the waveform monitoring circuit 14 through a waveform monitor terminal. The waveform detection circuit 30 included in the power transmission control device 20 detects a change in waveform of the induced voltage signal PHIN1 to detect the power-reception-side (secondary-side) load state.

The waveform monitoring circuit 14 generates the waveform-monitoring induced voltage signal PHIN1 based on a coil end signal CSG of the primary coil L1, and outputs the induced voltage signal PHIN1 to the power transmission control device 20. Specifically, the waveform monitoring circuit 14 includes a first rectifier circuit 17 having a limiter function. The rectifier circuit 17 includes a first resistor (current-limiting resistor) RA1 provided between a coil end node NA2 at which the coil end signal CSG of the primary coil L1 is generated and a first monitoring node NA11 at which the waveform-monitoring induced voltage signal PHIN1 is generated. The rectifier circuit 17 performs a limiter operation that clamps the induced voltage signal PHIN1 at a voltage VDD (high-potential-side power supply voltage), and subjects the induced voltage signal PHIN1 to half-wave rectification.

A situation in which an overcurrent from the coil end node NA2 flows into an IC terminal of the power transmission control device 20 is prevented by providing the current-limiting resistor RA1. A situation in which a voltage equal to or higher than the maximum rated voltage is applied to the IC terminal of the power transmission control device 20 is also prevented by causing the rectifier circuit 17 to clamp the induced voltage signal PHIN1 at the voltage VDD. Moreover, a situation in which a negative voltage is applied to the IC terminal of the power transmission control device 20 is prevented by causing the rectifier circuit 17 to subject the induced voltage signal PHIN1 to half-wave rectification.

Specifically, the rectifier circuit 17 includes a first diode DA1 provided between the monitoring node NA11 and a VDD (high-potential-side power supply in a broad sense) node, the forward direction of the first diode DA1 being a direction from the monitoring node NA11 to the VDD node. The rectifier circuit 17 also includes a second diode DA2 provided between the monitoring node NA11 and a GND (low-potential-side power supply in a broad sense) node, the forward direction of the second diode DA2 being a direction from the GND node to the monitoring node NA11. The VDD limit operation is implemented using the diode DA1, and half-wave rectification is implemented using the diode DA2.

3.2 Second Configuration Example

Figure 6:
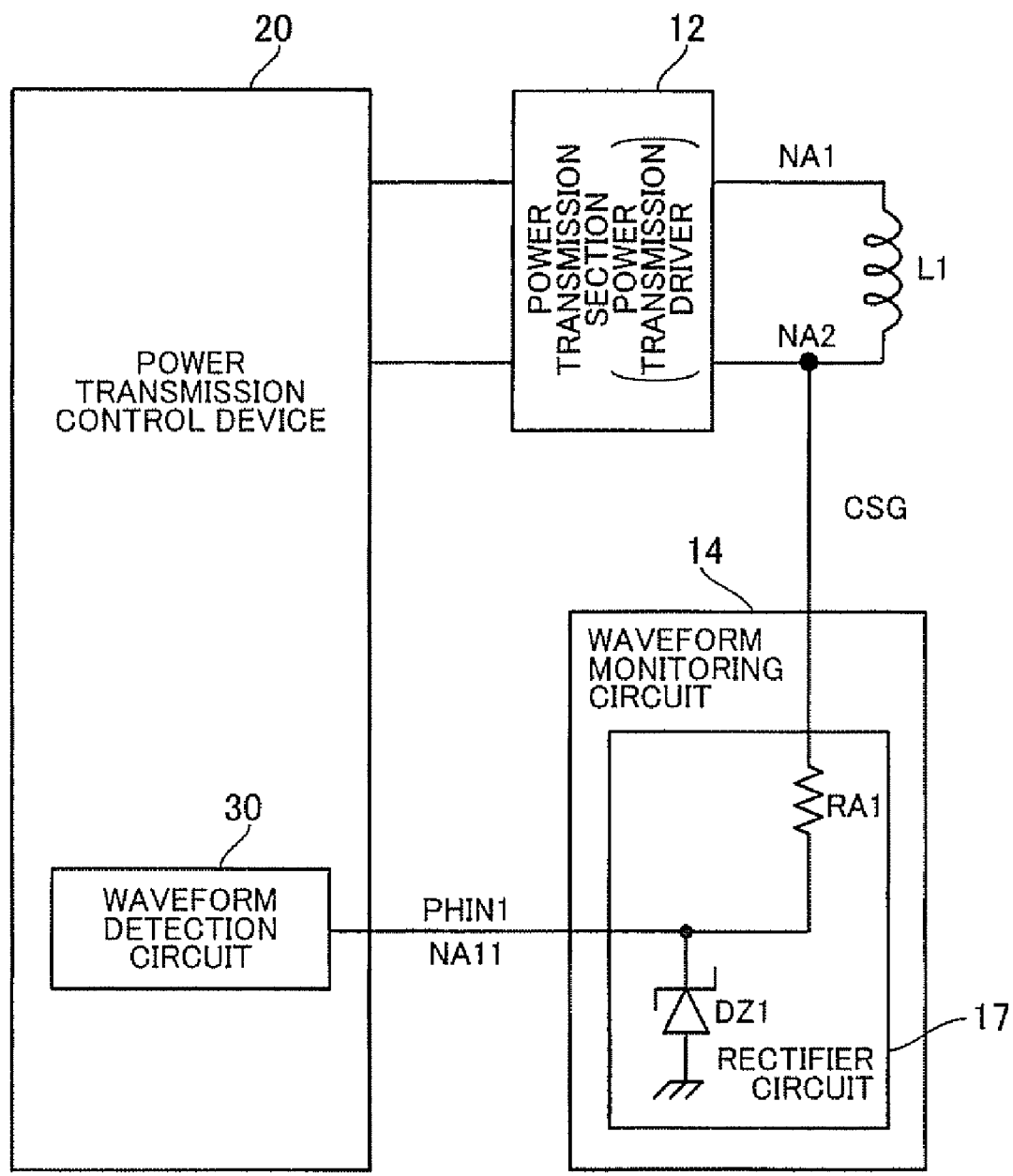
FIG. 6 shows a second configuration example of a waveform monitoring circuit according to one embodiment of the invention.

FIG. 6 shows a second configuration example of the waveform monitoring circuit 14. In the second configuration example, a Zener diode DZ1 is provided in the rectifier circuit 17 instead of the diode DA1 shown in FIG. 5. Specifically, the Zener diode is provided between the monitoring node NA11 and the GND (low-potential-side power supply) node, the forward direction of the Zener diode being a direction from the GND node to the monitoring node NA11.

3.3 Third Configuration Example

Figure 7:
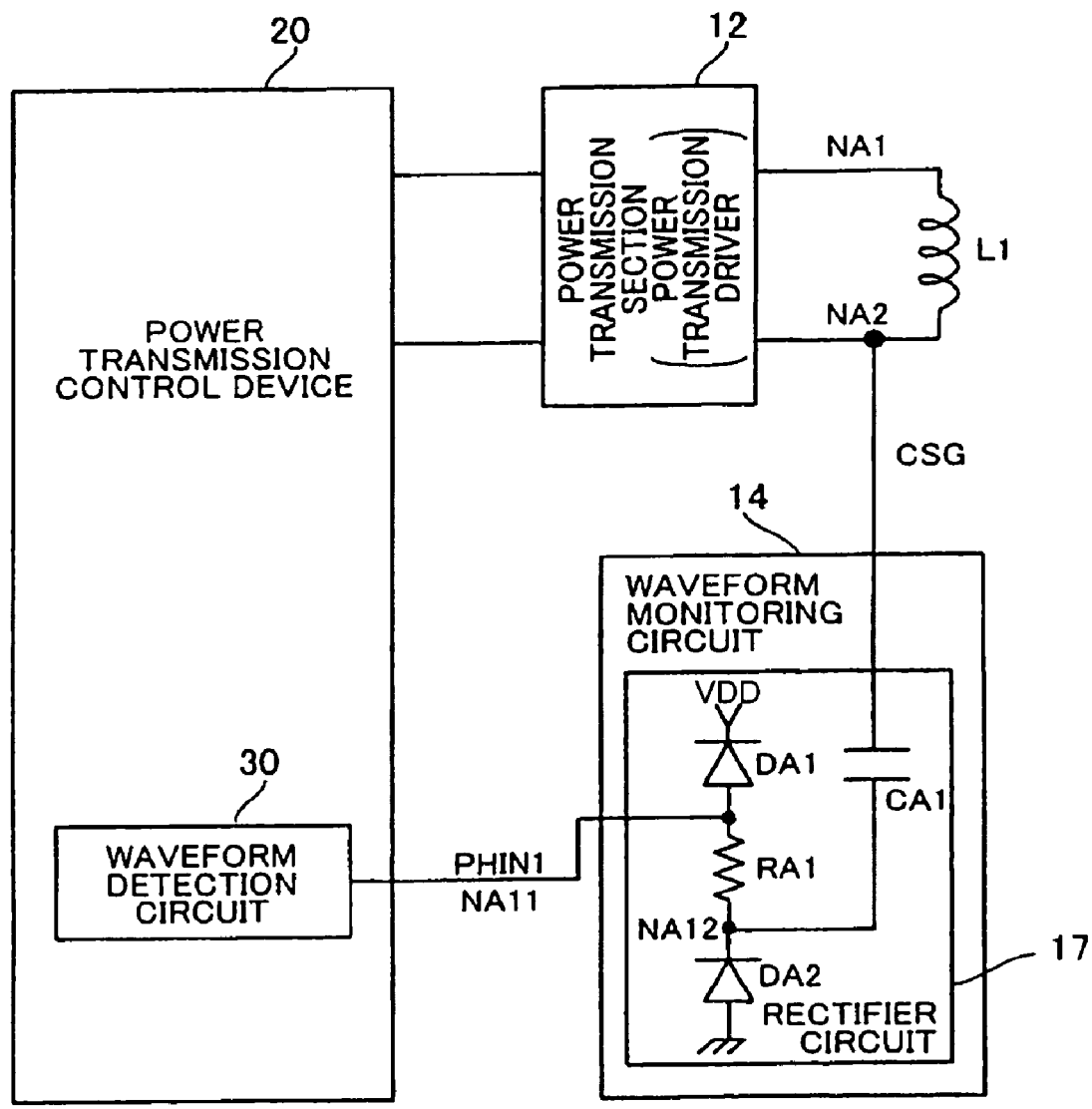
FIG. 7 shows a third configuration example of a waveform monitoring circuit according to one embodiment of the invention.

FIG. 7 shows a third configuration example of the waveform monitoring circuit 14. In the third configuration example, the waveform monitoring circuit 14 includes the first rectifier circuit 17 having a limiter function in the same manner as in the first configuration example. The rectifier circuit 17 performs a limiter operation that clamps the induced voltage signal PHIN1 at the voltage VDD (high-potential-side power supply voltage), and subjects the induced voltage signal PHIN1 to half-wave rectification. Specifically, a situation in which a voltage equal to or higher than the maximum rated voltage is applied to the IC terminal of the power transmission control device 20 is also prevented by causing the rectifier circuit 17 to clamp the induced voltage signal PHIN1 at the voltage VDD. Moreover, a situation in which a negative voltage is applied to the IC terminal of the power transmission control device 20 is prevented by causing the rectifier circuit 17 to subject the induced voltage signal PHIN1 to half-wave rectification.

Specifically, the rectifier circuit 17 includes a first diode DA1 and a second diode DA2. The first diode DA1 is provided between the monitoring node NA11 and a VDD node (high-potential-side power supply node in a broad sense), the forward direction of the first diode DA1 being a direction from the monitoring node NA11 to the VDD node. The second diode DA2 is provided between the monitoring node NA11 and a GND node (low-potential-side power supply node in a broad sense), the forward direction of the second diode DA2 being a direction from the GND node to the monitoring node NA11. The VDD limit operation is implemented using the first diode DA1, and half-wave rectification is implemented using the second diode DA2.

A first resistor RA1 (i.e., current-limiting resistor) is provided between the coil end node NA2 and the first monitoring node NA11 in order to prevent a situation in which an overcurrent from the coil end node NA2 flows into an IC terminal of the power transmission control device 20. In the third configuration example, the first resistor RA1 is disposed between the first diode DA1 and the second diode DA2, differing from the first configuration example.

In the third configuration example, a first capacitor CA1 is provided in the input stage of the rectifier circuit 17. Specifically, the first capacitor CA1 is provided between the coil end node NA2 and a low-potential-side resistor end node NA12 between the first resistor RA1 and the second diode DA2.

The coil end signal CSG may have a DC offset (i.e., the center voltage is not 0 V). A variation in pulse width of a pulse signal obtained by adjusting the waveform of the induced voltage signal PHIN1 or the like occurs when the DC offset changes, whereby the load state detection accuracy deteriorates. In the third configuration example, the first capacitor CA1 is provided in the input stage of the rectifier circuit 17 in order to cancel such a DC offset. An adverse effect of a change in DC offset of the coil end signal on the load state detection accuracy can be prevented by extracting only the AC component of the coil end signal by capacitive coupling of the first capacitor CA1. Moreover, the voltage level of the coil end signal can be shifted to a voltage level with high detection sensitivity that enables detection using a desired threshold voltage. Therefore, the detection accuracy for the pulse width of a pulse signal obtained by adjusting the waveform of the induced voltage signal PHIN1 output from the rectifier circuit 17 or the like is improved, whereby the load state can be detected with high sensitivity and a high dynamic range, for example.

3.4 Fourth Configuration Example

Figure 8:
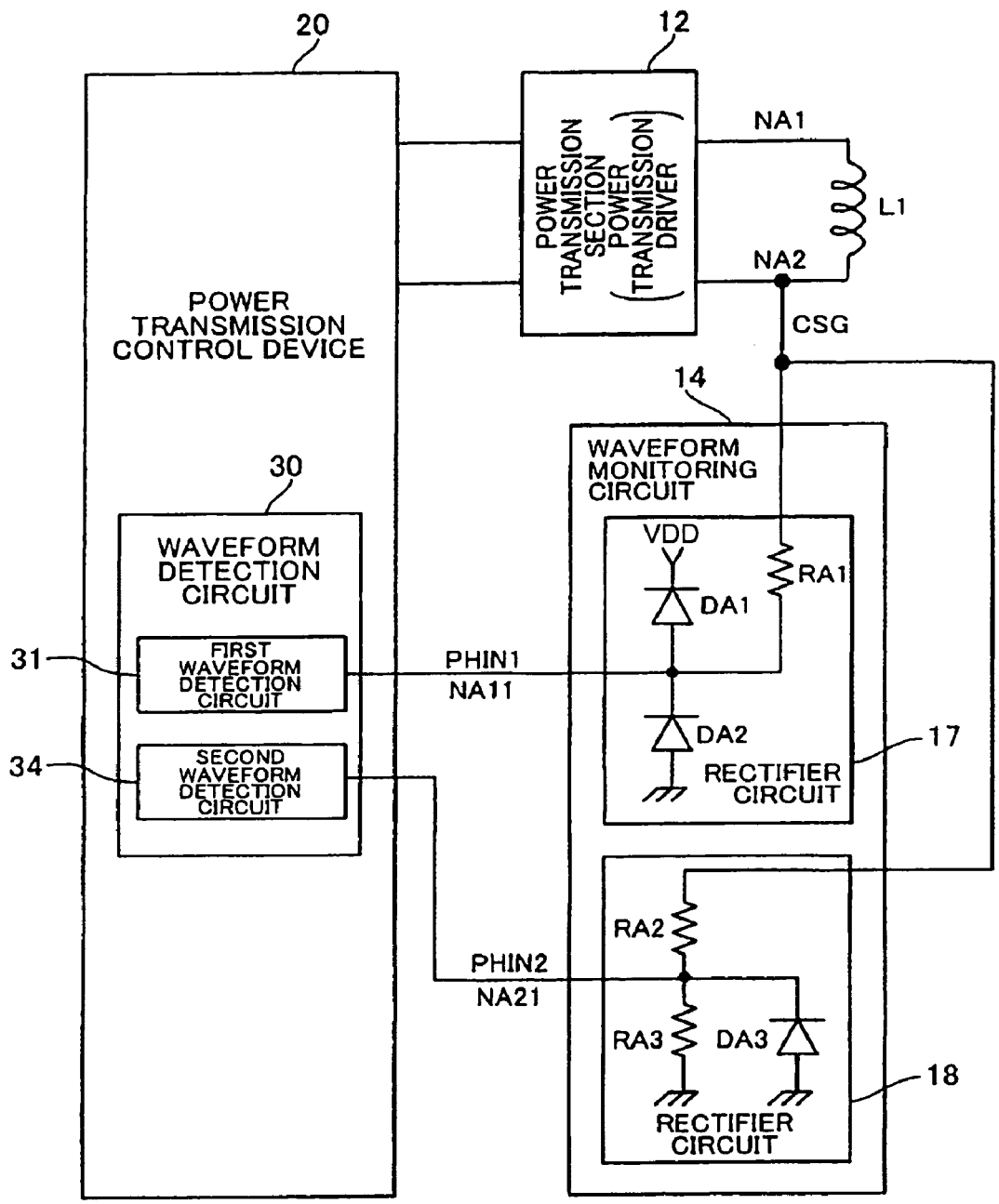
FIG. 8 shows a fourth configuration example of a waveform monitoring circuit according to one embodiment of the invention.

FIG. 8 shows a fourth configuration example of the waveform monitoring circuit 14. In FIG. 8, the waveform monitoring circuit 14 includes a second rectifier circuit 18 in addition to the first rectifier circuit 17. The waveform detection circuit 30 includes a first waveform detection circuit 31 and a second waveform detection circuit 34. The first waveform detection circuit 31 detects a change in waveform of the first induced voltage signal PHIN1 of the primary coil L1. The second waveform detection circuit 34 detects a chance in waveform of a second induced voltage signal PHIN2 of the primary coil L1.

The second rectifier circuit 18 outputs the waveform-monitoring second induced voltage signal PHIN2 to the second waveform detection circuit 34 through a second monitoring node NA21. Specifically, the rectifier circuit 18 includes a second resistor RA2 (i.e., current-limiting resistor) provided between the coil end node NA2 and the monitoring node NA21, and a third resistor RA3 provided between the monitoring node NA21 and a GND (low-potential-side power supply) node. The rectifier circuit 18 also includes a third diode DA3 provided between the monitoring node NA21 and the GND node. The voltage of the coil end signal CSG is divided by the resistors RA2 and RA3, and the divided voltage is input to the second waveform detection circuit 34 as the induced voltage signal PHIN2. The diode DA3 subjects the coil end signal CSG to half-wave rectification so that a negative voltage is not applied to the second waveform detection circuit 34.

Figure 9:
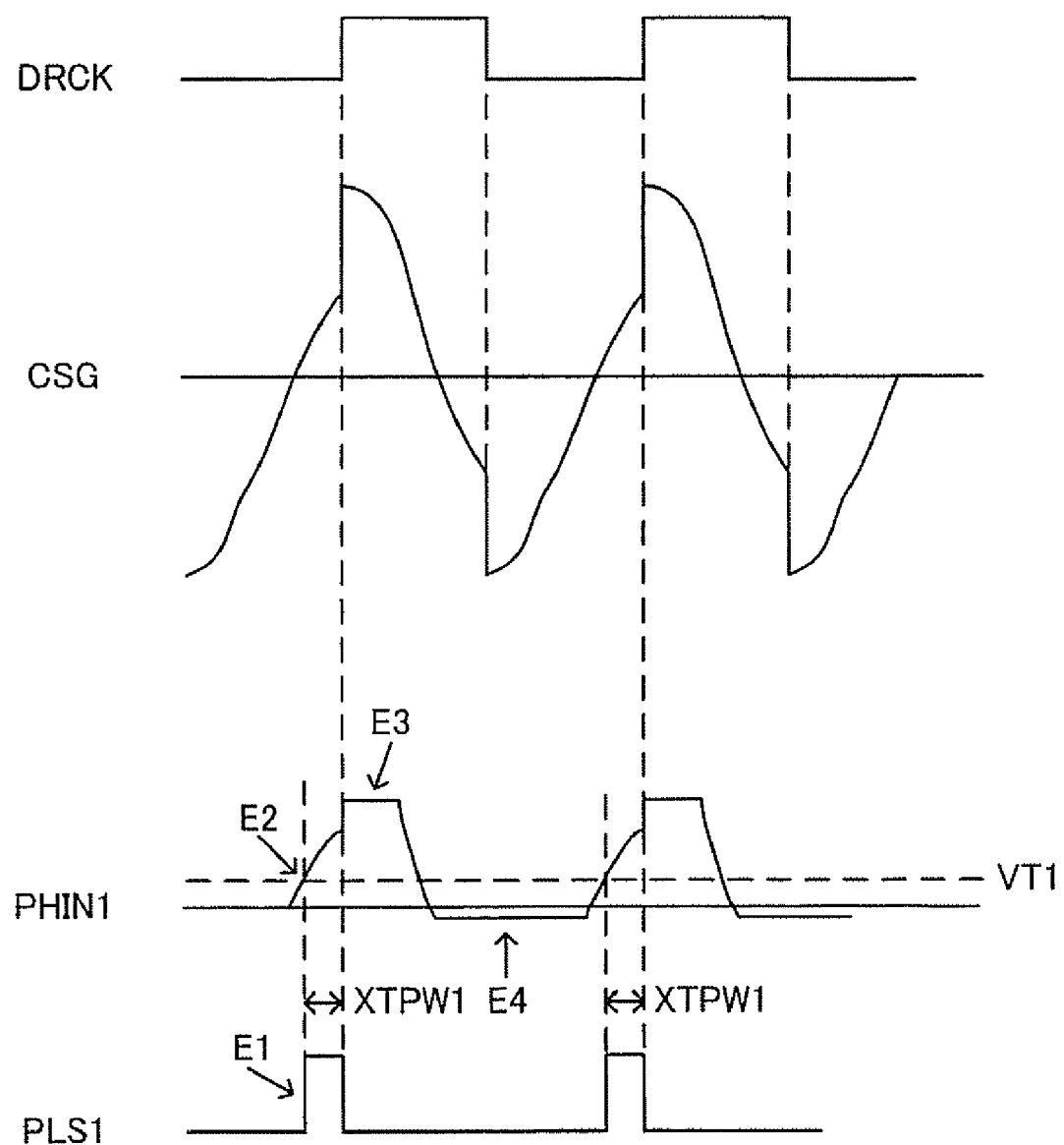
FIG. 9 shows a signal waveform example illustrative of the operation of a waveform monitoring circuit.

FIG. 9 shows a waveform example of the coil end signal CSG input to the rectifier circuit 17, the induced voltage signal PHIN1 output to the first waveform detection circuit 31 from the rectifier circuit 17, and a pulse signal PLS1 used for pulse width detection.

As indicated by E1 in FIG. 9, the first waveform detection circuit 31 detects a pulse width period XTPW1 that corresponds to a change in phase when the induced voltage signal PHIN1 (coil end signal CSG) rises. Specifically, the first waveform detection circuit 31 measures the pulse width period XTPW1 that is a period between the timing at which the induced voltage signal PHIN1 that has changed from 0 V exceeds a threshold voltage VT1 (see E2) and the edge timing (the rising edge timing in FIG. 9, but may be the falling edge timing) of the drive clock signal DRCK. In this case, since it suffices that a voltage near 0 V be detected, the waveform need not be reduced. Therefore, voltage division using the resistors RA2 and RA3 of the rectifier circuit 18 shown in FIG. 8 is unnecessary. This prevents a situation in which the waveform of the signal PHIN1 is deformed or the signal deteriorates due to a resistance division node and a parasitic capacitor. Therefore, since the first waveform detection circuit 31 can detect the waveform using the signal PHIN1 having a fine waveform, the detection accuracy can be improved.

When the waveform is not reduced by voltage division using resistors, the signal PHIN1 may exceed the maximum rated voltage of the power transmission control device 20. However, since the diode DA1 is provided in the rectifier circuit 17 and performs the limit operation that clamps the signal PHIN1 at the voltage VDD (E3), a situation in which the signal PHIN1 exceeds the maximum rated voltage can be prevented. Moreover, since the diode DA2 is provided in the rectifier circuit 17 and performs half-wave rectification (see E4), a situation in which a negative voltage is applied to the IC terminal of the power transmission control device 20 can be prevented.

Figure 10:
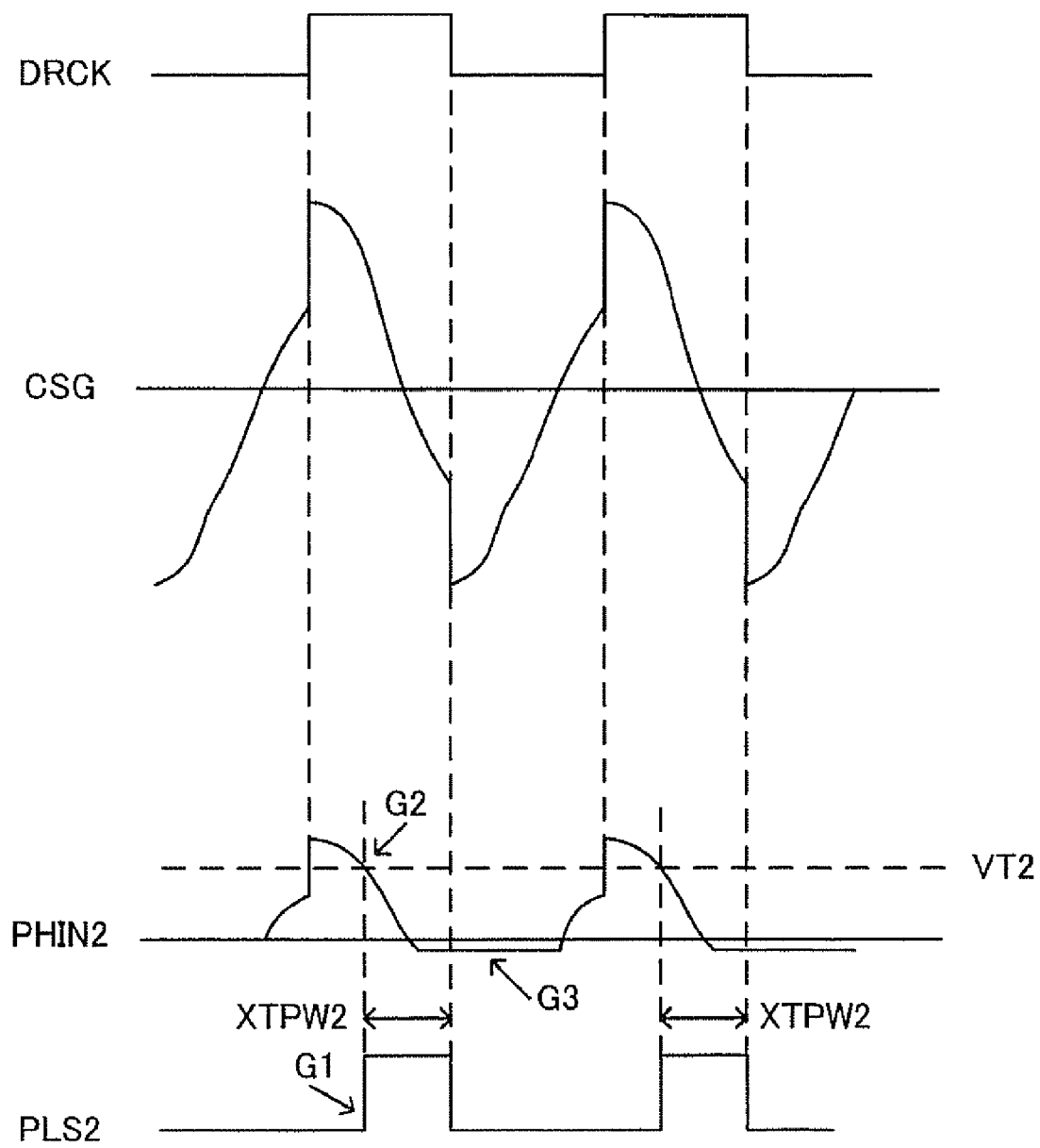
FIG. 10 shows a signal waveform example illustrative of the operation of a waveform monitoring circuit.

FIG. 10 shows a waveform example of the coil end signal CSG input to the rectifier circuit 18, the induced voltage signal PHIN2 output to the second waveform detection circuit 34 from the rectifier circuit 18, and a pulse signal PLS2 used for pulse width detection.

As indicated by G1 in FIG. 10, the second waveform detection circuit 34 detects a pulse width period XTPW2 that corresponds to a change in phase when the induced voltage signal PHIN2 (coil end signal CSG) falls. Specifically, the second waveform detection circuit 34 measures the pulse width period XTPW2 that is a period between the timing at which the induced voltage signal PHIN2 that has changed from the voltage VDD becomes lower than a threshold voltage VT2 (see G2) and the edge timing (the falling edge timing in FIG. 10, but may be the rising edge timing) of the drive clock signal DRCK. Therefore, since it is necessary to reduce the waveform of the coil end signal CSG that exceeds the voltage VDD, the rectifier circuit 18 performs voltage division using the resistors RA2 and RA3. Specifically, the threshold voltage of an N-type transistor can be used as the threshold voltage VT2 by reducing the waveform of the coil end signal CSG by dividing the voltage of the coil end signal CSG, for example. Since the diode DA3 is provided in the rectifier circuit 18 and performs half-wave rectification (see G3), a situation in which a negative voltage is applied to the IC terminal of the power transmission control device 20 can be prevented.

For example, when the induced voltage signal PHIN1 input to the first waveform detection circuit 31 shown in FIG. 8 is generated using, the rectifier circuit 18 instead of the rectifier circuit 17, the waveform of the induced voltage signal PHIN1 is reduced by voltage division. Therefore, the waveform is deformed near the threshold voltage VT1, whereby the detection accuracy may deteriorate.

In FIG. 8, since the induced voltage signal PHIN1 is generated using the rectifier circuit 17 that does not perform voltage division, such a situation can be prevented.

When the limit operation using the diode DA1 of the rectifier circuit 17 is performed, as indicated by E3 in FIG. 9, the VDD limit operation of the rectifier circuit 17 adversely affects the rectifier circuit 18 when the current-limiting resistor RA1 is not provided between the monitoring node NA11 and the coil end node NA2 shown in FIG. 8B. Specifically, when the current-limiting resistor RA1 is not provided, the voltage of the coil end node NA2 is clamped at the voltage VDD due to the limit operation of the rectifier circuit 17, whereby the operations of the power transmission driver and the rectifier circuit 18 are adversely affected.

In FIG. 8, since the current-limiting resistor RA1 is provided between the coil end node NA2 and the monitoring node NA11, a situation in which the VDD limit operation (see E3 in FIG. 9) of the rectifier circuit 17 adversely affects the rectifier circuit 18 can be prevented.

In FIG. 8, circuits (i.e., rectifier circuits 17 and 18) having different configurations are used as the circuits that generate the induced voltage signals PHIN1 and PHIN2 for the first and second waveform detection circuits 31 and 34, as described above. The dynamic range and the sensitivity complement each other by selectively utilizing the rectifier circuits 17 and 18, so waveform detection (pulse width detection) with high accuracy can be implemented.

3.5 Fifth Configuration Example

Figure 11:
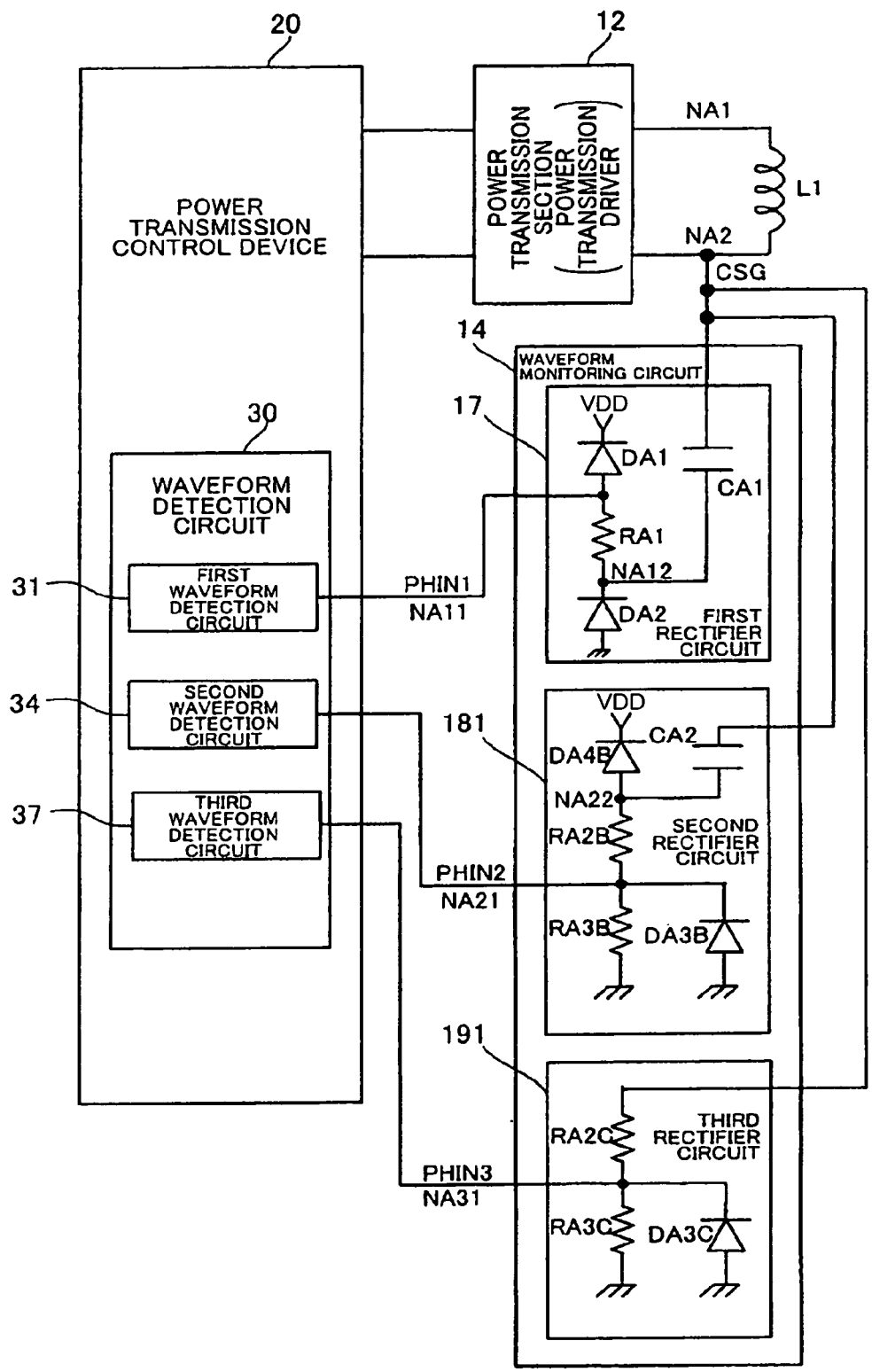
FIG. 11 shows a fifth configuration example of a waveform monitoring circuit according to one embodiment of the invention.

FIG. 11 shows a fifth configuration example of the waveform monitoring circuit 14. In FIG. 11, the waveform monitoring circuit 14 includes a second rectifier circuit 181 and a third rectifier circuit 191 in addition to the first rectifier circuit 17. The waveform detection circuit 30 includes the first waveform detection circuit 31, the second waveform detection circuit 34, and a third waveform detection circuit 37. The first waveform detection circuit 31 detects a change in waveform of the first induced voltage signal PHIN1 of the primary coil L1. The second waveform detection circuit 34 detects a change in waveform of the second induced voltage signal PHIN2 of the primary coil L1. The third waveform detection circuit 37 detects a change in waveform of a third induced voltage signal PHIN3 of the primary coil L1.

The first rectifier circuit 17 outputs the waveform-monitoring first induced voltage signal PHIN1 to the first waveform detection circuit 31 through the first monitoring node NA11. The configuration of the first rectifier circuit 17 is similar to that of the rectifier circuit included in the third configuration example of the waveform monitoring circuit 14 shown in FIG. 7. Specifically, the first rectifier circuit 17 includes the first diode DA1 provided between the monitoring node NA11 and the VDD node, and the second diode DA2 provided between the monitoring node NA11 and the GND node. The VDD limit operation is implemented using the first diode DA1, and half-wave rectification is implemented using the second diode DA2.

The first resistor RA1 (i.e., current-limiting resistor) is provided between the coil end node NA2 and the first monitoring node NA11 in order to prevent a situation in which an overcurrent from the coil end node NA2 flows into the IC terminal of the power transmission control device 20. Specifically, the first resistor RA1 is disposed between the first diode DA1 and the second diode DA2. The first capacitor CA1 is provided in the input stage of the first rectifier circuit 17 (i.e., between the coil end node NA2 and the low-potential-side resistor end node NA12 between the first resistor RA1 and the second diode DA2).

The second rectifier circuit 181 outputs the waveform-monitoring second induced voltage signal PHIN2 to the second waveform detection circuit 34 through the second monitoring node NA21. The second rectifier circuit 181 includes a third diode DA3B provided between the second monitoring node NA21 and the GND node, and a fourth diode DA4B provided between the second monitoring node NA21 and the VDD node. In the second rectifier circuit 181, the VDD limit operation is implemented using the fourth diode DA4B, and half-wave rectification is implemented using the third diode DA3B.

In order to prevent a situation in which an overcurrent from the coil end node NA2 flows into the IC terminal of the power transmission control device 20, a second resistor RA2B (i.e., current-limiting resistor) is provided between the coil end node NA2 and the second monitoring node NA21, and a third resistor RA3B is provided between the second monitoring node NA21 and the GND node. The second capacitor CA2 is provided in the input stage of the second rectifier circuit 181 (i.e., between the coil end node NA2 and a high-potential-side resistor end node NA22 between the second resistor RA2B and the fourth diode DA4B).

The third rectifier circuit 191 outputs the waveform-monitoring third induced voltage signal PHIN3 to the third waveform detection circuit 37 through a third monitoring node NA31. Specifically, the third rectifier circuit 191 includes a fourth resistor RA2C provided between the coil end node NA2 and the third monitoring node NA31, and a fifth resistor RA3C provided between the monitoring node NA31 and the GND node. The third rectifier circuit 191 also includes a fifth diode DA3C provided between the monitoring node NA31 and the GND node. The voltage of the coil end signal CSG is divided by the resistors RA2C and RA3C, and the resulting signal is input to the third waveform detection circuit 37 as the induced voltage signal PHIN3. The diode DA3C subjects the coil end signal CSG to half-wave rectification so that a negative voltage is not applied to the third waveform detection circuit 37.

Figure 12:
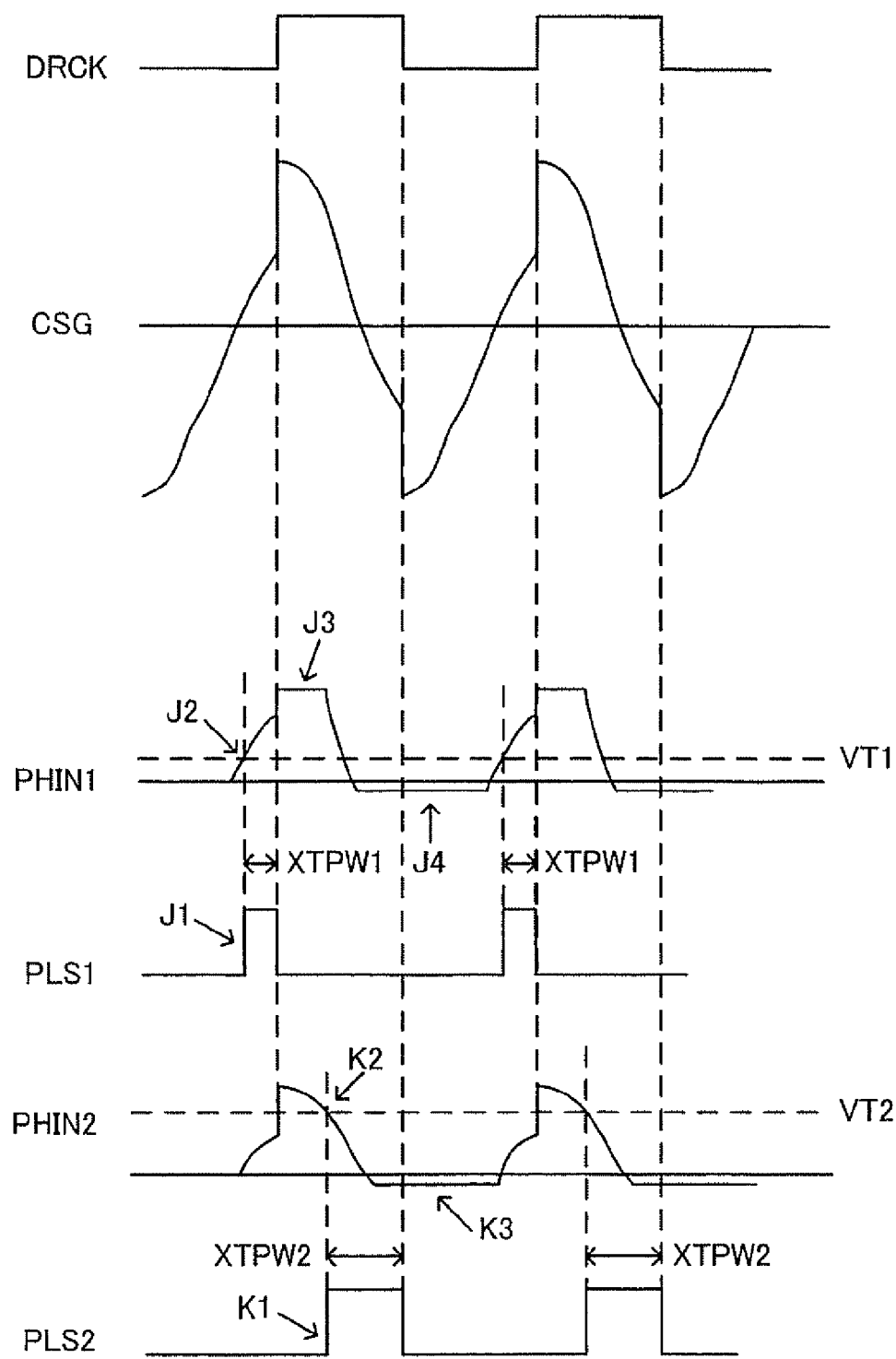
FIG. 12 shows a signal waveform example illustrative of the operation of a waveform monitoring circuit.

FIG. 12 shows a waveform example of the coil end signal CSG input to the first rectifier circuit 17 and the second rectifier circuit 181, the induced voltage signal PHIN1 output to the first waveform detection circuit 31 from the first rectifier circuit 17, the pulse signal PLS1 used for pulse width detection, the induced voltage signal PHIN2 output to the second waveform detection circuit 34 from a second rectifier circuit 181, and the pulse signal PLS2 used for pulse width detection.

As indicated by J1 in FIG. 12, the first waveform detection circuit 31 detects the pulse width period XTPW1 that corresponds to a change in phase when the induced voltage signal PHIN1 (coil end signal CSG) rises. Specifically, the first waveform detection circuit 31 measures the pulse width period XTPW1 that is a period between the timing at which the induced voltage signal PHIN1 that has changed from 0 V exceeds the threshold voltage VT1 (see J2) and the edge timing (the rising edge timing in FIG. 12, but may be the falling edge timing) of the drive clock signal DRCK. In this case, since it suffices that a voltage near 0 V be detected, the waveform need not be reduced. Therefore, voltage division using the resistors RA2B and RA3B of the rectifier circuit 181 shown in FIG. 11 is unnecessary. This prevents a situation in which the waveform of the signal PHIN1 is deformed or the signal deteriorates due to a resistance division node and a parasitic capacitor. Therefore, since the first waveform detection circuit 31 can detect the waveform using the signal PHIN1 having a fine waveform, the detection accuracy can be improved.

When the waveform is not reduced by voltage division using resistors, the signal PHIN1 may exceed the maximum rated voltage of the power transmission control device 20. However, since the diode DA1 is provided in the rectifier circuit 17 and performs the limit operation that clamps the signal PHIN1 at the voltage VDD (see J3), a situation in which the signal PHIN1 exceeds the maximum rated voltage can be prevented. Moreover, since the diode DA2 is provided in the rectifier circuit 17 and performs half-wave rectification (see J4), a situation in which a negative voltage is applied to the IC terminal of the power transmission control device 20 can be prevented.

As indicated by K1, the second waveform detection circuit 34 detects the pulse width period XTPW2 that corresponds to a change in phase when the induced voltage signal PHIN2 (coil end signal CSG) falls. Specifically, the second waveform detection circuit 34 measures the pulse width period XTPW2 that is a period between the timing at which the induced voltage signal PHIN2 that has changed from the voltage VDD becomes lower than the threshold voltage VT2 (see K2) and the edge timing (the falling edge timing in FIG. 12, but may be the rising edge timing) of the drive clock signal DRCK. Therefore, since it is necessary to reduce the waveform of the coil end signal CSG that exceeds the voltage VDD, the rectifier circuit 181 performs voltage division using the resistors RA2B and RA3B. Specifically, the threshold voltage of an N-type transistor can be used as the threshold voltage VT2 by reducing the waveform of the coil end signal CSG by dividing the voltage of the coil end signal CSG, for example. Since the diode DA3B is provided in the rectifier circuit 181 and performs half-wave rectification (see K3), a situation in which a negative voltage is applied to the IC terminal of the power transmission control device 20 can be prevented.

For example, when the induced voltage signal PHIN1 input to the first waveform detection circuit 31 shown in FIG. 11 is generated using the rectifier circuit 181 instead of the rectifier circuit 17, the waveform of the induced voltage signal PHIN1 is reduced by voltage division. Therefore, the waveform is deformed near the threshold voltage VT1, whereby the detection accuracy may deteriorate.

In FIG. 11, since the induced voltage signal PHIN1 is generated using the rectifier circuit 17 that does not perform voltage division, such a situation can be prevented.

In FIG. 11, circuits (i.e., the rectifier circuits 17 and 181) having different configurations are used as the circuits that generate the induced voltage signals PHIN1 and PHIN2 for the first and second waveform detection circuits 31 and 34, as described above. The dynamic range and the sensitivity complement each other by selectively utilizing the rectifier circuits 17 and 181, so waveform detection (pulse width detection) with high accuracy can be implemented.

In the fifth configuration example, since the first capacitor CA1 and the second capacitor CA2 are respectively provided in the input stage of the first rectifier circuit 17 and the second rectifier circuit 181, the DC offset of the coil end signal CSG can be canceled by capacitive coupling of the capacitors CA1 and CA2. This prevents a situation in which a change in DC offset adversely affects the load state detection accuracy. This enables load state detection with high sensitivity and a high dynamic range, for example.

4. First Configuration Example of Power Transmission Device

Figure 13:
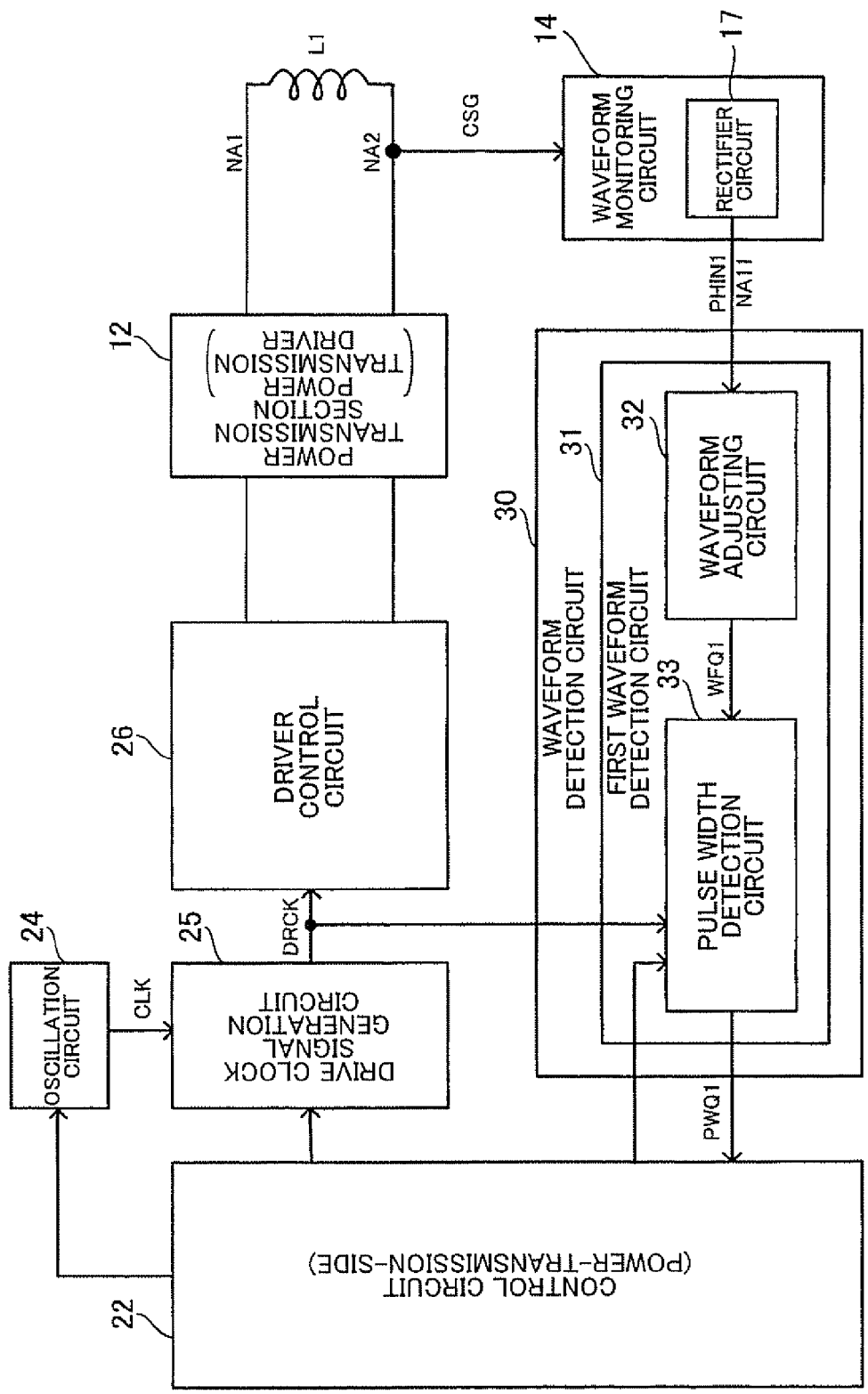
FIG. 13 shows a first configuration example of a power transmission device according to one embodiment of the invention.

FIG. 13 shows a first configuration example of the power transmission device 10. FIG. 13 corresponds to the first configuration example of the waveform monitoring circuit 14 shown in FIG. 5.

In FIG. 13, when the inductance of the primary coil L1, the capacitance of the capacitor that forms the resonant circuit, the power supply voltage, the distance or the positional relationship between the primary coil L1 and the secondary coil L2, or the like has changed, the voltage peak (amplitude) of the induced voltage signal PHIN1 also changes. Therefore, a change in load may not be accurate detected by merely detecting the peak voltage of the induced voltage signal PHIN. In FIG. 13, a change in load is detected by detecting pulse width information relating to the induced voltage signal PHIN.

In FIG. 13, the drive clock signal generation circuit 25 generates the drive clock signal DRCK that specifies the drive frequency of the primary coil L1. Specifically, the drive clock signal generation circuit 25 generates the drive clock signal DRCK by dividing the frequency of a reference clock signal CLK generated by the oscillation circuit 24. An alternating-current voltage at a drive frequency specified by the drive clock signal DRCK is supplied to the primary coil L1.

The driver control circuit 26 generates a driver control signal based on the drive clock signal DRCK, and outputs the driver control signal to the power transmission drivers (first and second power transmission drivers) of the power transmission section 12 that drives the primary coil L1. In this case in order to prevent a shoot-through current from flowing through the inverter circuit of the power transmission driver, the driver control circuit 26 generates the driver control signal so that a signal input to the gate of a P-type transistor of the inverter circuit does not overlap a signal input to the gate of an N-type transistor of the inverter circuit.

The waveform detection circuit 30 includes the first waveform detection circuit 31 that detects a change in waveform of the first induced voltage signal PHIN1 of the primary coil L1. The first waveform detection circuit 31 includes the first waveform adjusting circuit 32 and the first pulse width detection circuit 33. The waveform adjusting circuit 32 (pulse signal generation circuit) adjusts the waveform of the induced voltage signal PHIN1 of the primary coil L1, and outputs a waveform-adjusted signal WFQ1. Specifically, the waveform adjusting circuit 32 outputs the square wave (rectangular wave) waveform-adjusted signal WFQ1 (pulse signal) that becomes active (e.g., H level) when the signal PHIN1 has exceeded a given threshold voltage, for example.

The pulse width detection circuit 33 detects pulse width information relating to the induced voltage signal PHIN1 of the primary coil L1. Specifically, the pulse width detection circuit 33 receives the waveform-adjusted signal WFQ1 from the waveform adjusting circuit 32 and the drive clock signal DRCK (drive control signal) from the drive clock signal generation circuit 25, and detects the pulse width information relating to the waveform-adjusted signal WFQ1 to detect the pulse width information relating to the induced voltage signal PHIN1.

For example, a timing at which the induced voltage signal PHIN1 that has changed from the voltage GND (low-potential-side power supply voltage) exceeds the first threshold voltage VT1 is referred to as a first timing. In this case, the pulse width detection circuit 33 measures a first pulse width period that is a period between a first edge timing (e.g., falling edge timing) of the drive clock signal DRCK and the first timing to detect first pulse width information. For example, the pulse width detection circuit 33 measures the first pulse width period in which the voltage signal PHIN1 induced by a change in voltage of the drive clock signal DRCK becomes equal to or lower than the given threshold voltage VT1. The pulse width detection circuit 33 measures the pulse width of the waveform-adjusted signal WFQ1 (induced voltage signal) with respect to the pulse width of the drive clock signal DRCK. In this case, the first pulse width period is measured using the reference clock signal CLK, for example. A latch circuit (not shown) latches measurement result data PWQ1 obtained by the pulse width detection circuit 33 for example. Specifically, the pulse width detection circuit 33 measures the first pulse width period using a counter that increments (or decrements) the count value based on the reference clock signal CLK, and the latch circuit latches the measurement result data PWQ1.

The control circuit 22 detects the power-reception-side (secondary-side) load state (change in load or degree of load) based on the pulse width information detected by the pulse width detection circuit 33. Specifically, the control circuit 22 performs foreign object detection (primary foreign object detection) based on the pulse width information detected by the pulse width detection circuit 33. The control circuit 22 may detect data transmitted from the power reception device 40 by means of load modulation.

FIGS. 14A to 14C show measurement results for the signal waveforms of the drive clock signal DRCK, the coil end signal CSG, the induced voltage signal PHIN1, and the pulse signal PLS1. FIGS. 14A, 14B, and 14C show signal waveforms (voltage waveforms) in a low-load state (e.g., secondary-side load current=0 mA), a medium-load state (load current=70 mA), and a high-load state (load current=150 mA), respectively. The pulse signal PLS1 used for pulse width detection is a signal that is set at the H level at a first timing TM1 at which the induced voltage signal PHIN1 exceeds the first threshold voltage VT1 and is set at the L level at a rising edge timing TR of the drive clock signal DRCK. As the threshold voltage VT1 (e.g. a threshold voltage of an N-type transistor) used to measure the pulse width period, a voltage at which the load state detection accuracy is optimized may be appropriately selected.

As shown in FIGS. 14A to 14C, the pulse width period XTPW1 of the pulse signal PLS1 increases as the power-reception-side load increases (i.e., the load current increases). Therefore, the power-reception-side load state (degree of load) can be detected by measuring the pulse width period XTPW1. For example, when a foreign object such as a metal foreign object has been placed on the primary coil L1 (inserted between the primary coil L1 and the secondary coil L2), power is supplied to the foreign object from the primary-side instrument, whereby the power-reception-side instrument is overloaded. In this case, the overload state can be detected by measuring the pulse width period XTPW1 so that foreign object detection (primary foreign object detection) can be implemented. Moreover, whether the data transmitted from the power-reception-side instrument is "0" or "1" can be detected by determining the degree of load of the load modulation section 46 of the power reception device 40 by measuring the pulse width period XTPW1.

In FIGS. 14A to 14C, the period from the timing TM1 to the rising edge timing TR of the drive clock signal DRCK is defined as the pulse width period XTPW1. In this case, the first waveform detection circuit 31 detects the pulse width period XTPW1 of the pulse signal PLS1 as the first pulse width information. Note that it is desirable that the period from a falling edge timing TF of the drive clock signal DRCK to the timing TM1 be specified as a pulse width period TPW1 (see FIG. 17), and the first waveform detection circuit 31 detect the pulse width period TPW1 as the first pulse width information. This prevents a situation in which the pulse width period is measured while regarding a noise signal as a pulse signal when the power-reception-side load is low. In this case, the pulse width period TPW1 decreases as the power-reception-side load increases. This makes it possible to determine that a foreign object has been placed (inserted) on the primary coil L1 when the pulse width period TPW1 (pulse width count) has become shorter than a given period (Given count), whereby foreign object detection can be implemented.

FIG. 15A shows a primary-side equivalent circuit in a no-load state, and FIG. 15B shows a primary-side equivalent circuit in a load-connected state. As shown in FIG. 15A, a series resonant circuit is formed by a capacitance C, a primary-side leakage inductance L11, and a coupling inductance M. Therefore, the resonance characteristics in a no-load state have a sharp profile with a high Q value, as indicated by B1 in FIG. 15C. A secondary-side leakage inductance L12 and a resistance RL of the secondary-side load are added in a load-connected state. Therefore, resonance frequencies fr2 and fr3 in a load-connected state are higher than a resonance frequency fr1 in a no-load state, as shown in FIG. 15C. The resonance characteristics in a load-connected state have a gentle profile with a low Q value due to the effect of the resistance RL. The resonance frequency increases as the load increases from a low-load state (RL: high) to a high-load state (RL: low), and approaches the drive frequency of the coil (frequency of the drive clock signal DRCK).

When the resonance frequency approaches the drive frequency, a sine wave (resonance waveform) is gradually observed. In the voltage waveform in a low-load state shown in FIG. 14A, a square wave (drive waveform) is predominant over a sine wave (resonance waveform). In the voltage waveform in a high-load state shown in FIG. C1, a sine wave (resonance waveform) is predominant over a square wave (drive waveform). As a result, the pulse width period XTPW1 increases (the pulse width period TPW1 decreases) as the load increases. Therefore, a change (degree) in power-reception-side load can be determined using a simple configuration by measuring the pulse width period XTPW1 (TPW1).

For example, a change in power-reception-side load due to insertion of a metal foreign object or the like may be determined by detecting only a change in peak voltage of the coil end signal. However, the peak voltage also changes due to the distance or the positional relationship between the primary coil L1 and the secondary coil L2 in addition to a chance in load. Therefore, a variation in load change detection increases.

In the pulse width detection method according to this embodiment, a chance in load is detected by measuring the pulse width period that changes due to the power-reception-side load state by digital processing instead of detecting the peak voltage. Therefore, a change in load can be detected with a small variation.

A change in power-reception-side load may be determined based on phase characteristics due to load. The term "phase characteristics due to load" used herein refers to a voltage/current phase difference. This method complicates the circuit configuration and increases cost.

In the pulse width detection method according to this embodiment, since digital data can be processed using a simple waveform adjusting circuit and a counter circuit (counter) utilizing the voltage waveform, the circuit configuration can be simplified. Moreover, the pulse width detection method according to this embodiment can be easily combined with the amplitude detection method that detects a change in load by detecting the peak voltage.

In the pulse width detection method according to this embodiment, the pulse width period XTPW1 specified by the timing TM1 at which the induced voltage signal PHIN1 that has changed from 0 V (GND) exceeds the threshold voltage VT1 is measured, as shown in FIGS. 14A to 14C. Therefore, an adverse effect due to a change in power supply voltage or a change in distance or positional relationship between the primary coil and the secondary coil can be reduced by setting the threshold voltage VT1 at a value close to 0 V, whereby a change in load can be detected with a further reduced variation.

Figure 16:
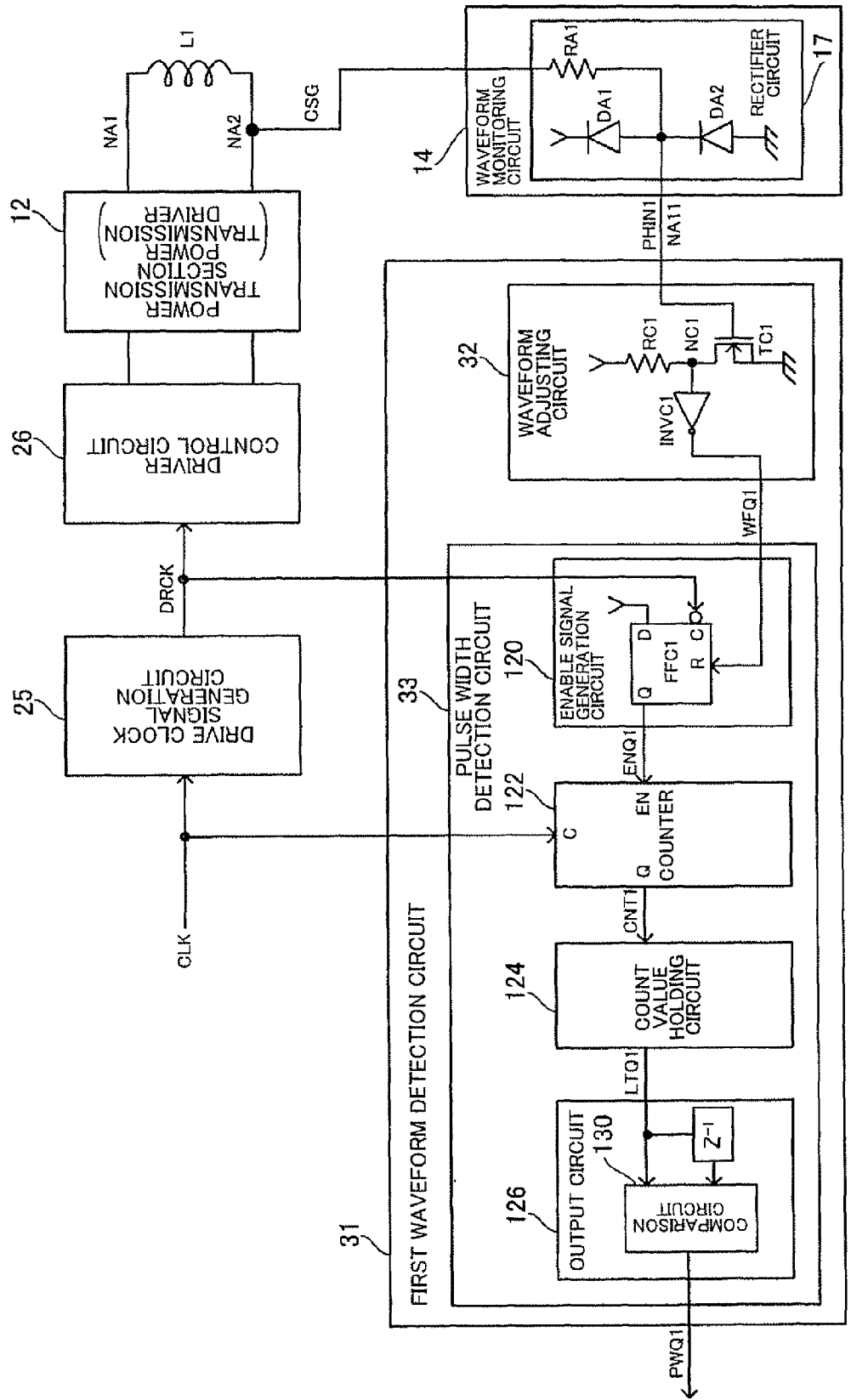
FIG. 16 shows a specific example of a first configuration example of a power transmission device.

FIG. 16 shows a specific example of the first configuration example of the power transmission device 10 according to this embodiment.

The waveform adjusting circuit 32 includes a resistor RC1 and an N-type transistor TC1 connected in series between the power supply VDD (high-potential-side power supply) and the power supply GND (low-potential-side power supply), and an inverter circuit INVC. The induced voltage signal PHIN1 from the waveform monitoring circuit 14 is input to the gate of the transistor TC1. When the signal PHIN1 has exceeded the threshold voltage of the transistor TC1, the transistor TC1 is turned ON so that the voltage of a node NC1 is set at the L level. Therefore, the waveform-adjusted signal WFQ1 is set at the H level. When the signal PHIN1 has become lower than the threshold voltage, the waveform-adjusted signal WFQ1 is set at the L level.

The pulse width detection circuit 33 includes a first counter 122. The counter 122 increments (or decrements) the count value in the pulse width period, and measures the pulse width period (first pulse width period) based on the resulting count value. In this case, the counter 122 counts the count value based on the reference clock signal CLK, for example.

More specifically, the pulse width detection circuit 33 includes a first enable signal generation circuit 120. The enable signal generation circuit 120 receives the first waveform-adjusted signal WFQ1 and the drive clock signal DRCK, and generates a first enable signal ENQ1 that becomes active in the first pulse width period. The counter 122 increments (or decrements) the count value when the enable signal ENQ1 is active (e.g., H level).

The enable signal generation circuit 120 may be formed using a flip-flop circuit FFC1, the drive clock signal DRCK (including a signal equivalent to the drive clock signal DRCK) being input to a clock terminal (inverting clock terminal) of the flip-flop circuit FFC1, a voltage VDD (high-potential-side power supply voltage) being input to a data terminal of the flip-flop circuit FFC1, and the waveform-adjusted signal WFQ1 (including a signal equivalent to the waveform-adjusted signal WFQ1) being input to a reset terminal (non-inverting reset terminal) of the flip-flop circuit FFC1. When the waveform-adjusted signal WFQ1 is set at the L level and the drive clock signal DRCK is then set at the L level, the enable signal ENQ1 (i.e., output signal) from the flip-flop circuit FFC1 is set at the H level (active). When the waveform-adjusted signal WFQ1 is set at the H level, the flip-flop circuit FFC1 is reset so that the enable signal ENQ1 (output signal) from the flip-flop circuit FFC1 is set at the L level (inactive). Therefore, the counter 122 can measure the pulse width period by counting the period in which the enable signal ENQ1 is set at the H level (active) based on the reference clock signal CLK.

Note that the enable signal generation circuit 120 may be formed using a flip-flop circuit, the drive clock signal DRCK being input to a clock terminal of the flip-flop circuit, a data terminal of the flip-flop circuit being connected to the power supply GND (low-potential-side power supply), and the waveform-adjusted signal WFQ1 being input to a set terminal of the flip-flop circuit. In this case, a signal obtained by inverting the output signal from the flip-flop circuit may be input to the counter 122 as the enable signal ENQ1.

A count value holding circuit 124 holds a count value CNT1 (pulse width information) from the counter 122. The count value holding circuit 124 outputs data LTQ1 relating to the held count value to an output circuit 126.

The output circuit 126 (filter circuit or noise removal circuit) receives the data LTQ1 relating to the count value held by the count value holding circuit 124, and outputs the data PWQ1 (first pulse width information). The output circuit 126 may include a comparison circuit 130 that compares the count value currently held by the count value holding circuit 124 with the count value previously held by the count value holding circuit 124, and outputs the count value larger than the other, for example. This allows the maximum count value to be held by and output from the output circuit 126. This suppresses a change in pulse width period due to noise or the like, whereby the pulse width can be stably detected. Moreover, the pulse width detection method can be easily combined with the amplitude detection method.

Figure 17:
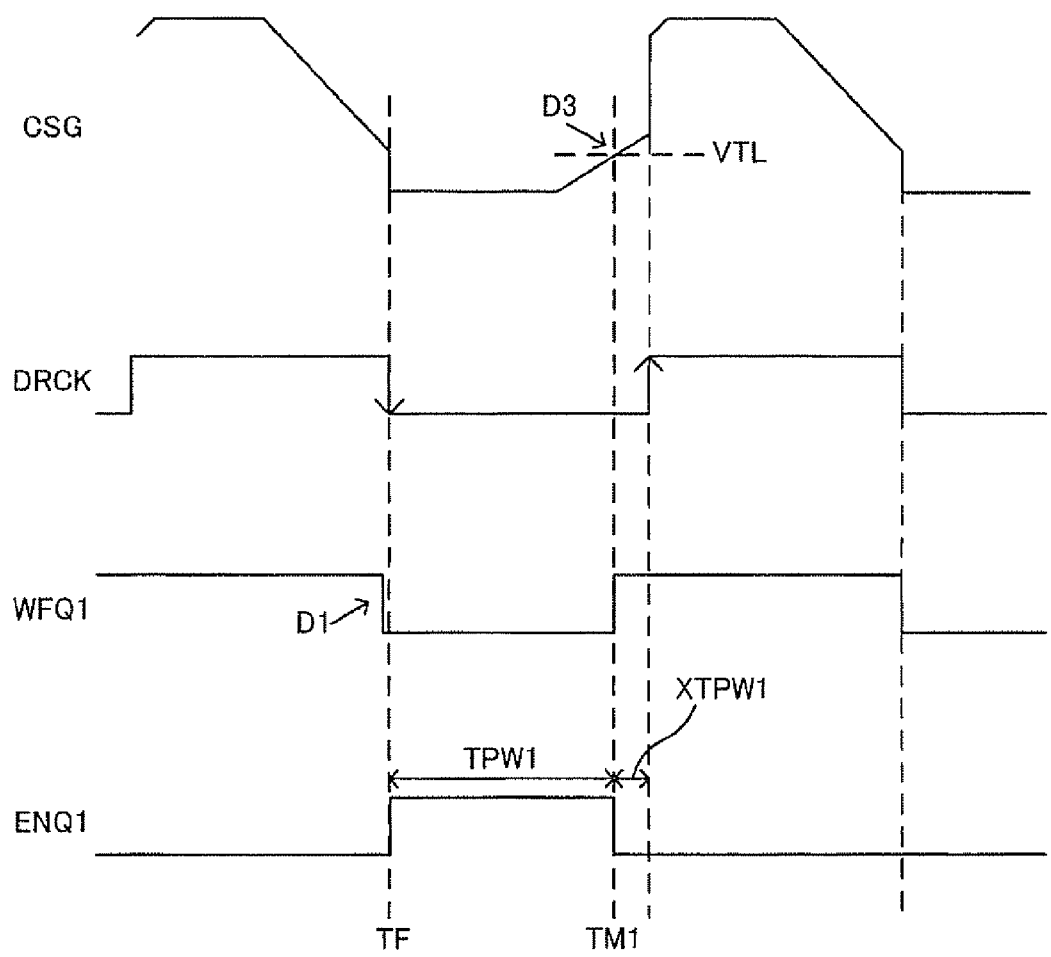
FIG. 17 shows a signal waveform example illustrative of the operation of a first configuration example of a power transmission device.

FIG. 17 shows a signal waveform example illustrative of the operation of the circuit shown in FIG. 16. When the waveform-adjusted signal WFQ1 is set at the L level at a timing indicated by D1 in FIG. 17, the reset state of the flip-flop circuit FFC1 is canceled. The voltage VDD is input to the flip-flop circuit FFC1 at the falling edge timing TF of the drive clock signal DRCK, whereby the enable signal ENQ1 changes from the L level to the H level. This causes the counter 122 to start the count process and measure the pulse width period TPW1 using the reference clock signal CLK.

When the waveform-adjusted signal WFQ1 is set at the H level at the first timing TM1, the flip-flop circuit FFC1 is reset so that the enable signal ENQ1 changes from the H level to the L level. This causes the counter 122 to stop the count process. The count value obtained by the count process is the measurement result that indicates the pulse width period TPW1.

As shown in FIG. 17, the sum of the pulse width periods TPW1 and XTPW1 corresponds to the half-cycle period of the drive clock signal DRCK. The pulse width period XTPW1 shown in FIGS. 14A to 14C increases as the power-reception-side load increases. Therefore, the pulse width period TPW1 shown in FIG. 17 decreases as the power-reception-side load increases. In the pulse width period XTPW1 shown in FIGS. 14A to 14C, it is difficult to distinguish a noise signal from a pulse signal when the power-reception-side load is low. Such a problem can be prevented using the pulse width period TPW1 shown in FIG. 17.

In the first pulse width detection method according to this embodiment, the pulse width period TPW1 is specified based on the timing TM1 at which the coil end signal CSG that has changed from 0 V exceeds a low-potential-side threshold voltage VTL, as indicated by D3 in FIG. 17. Specifically, the pulse width period TPW1 is the period between the falling edge timing TF of the drive clock signal CLK and the timing TM1. The pulse width period TPW1 changes when the timing TM1 has changed due to a change in power-reception-side change in load. Since the threshold voltage VTL that determines the timing TM1 is low, the timing TM1 varies to only a small extent even if the power supply voltage or the like has changed. The timing TM1 varies to only a small extent even if the distance or the positional relationship between the coils L1 and L2 has changed. Therefore, the first method according to this embodiment implements a pulse width detection method that reduces an adverse effect of a change in power supply voltage or the like.

The rectifier circuit 17 shown in FIG. 16 outputs the coil end signal CSG to the waveform adjusting circuit 32 as the induced voltage signal PHIN1 without dividing the voltage of the coil end signal CSG, differing from the rectifier circuit 18 (see FIG. 22) described later utilizing the second method according to this embodiment. Therefore, the threshold voltage VTL shown in FIG. 17 is almost equal to the threshold voltage of the N-type transistor TC1 of the waveform adjusting circuit 32 shown in FIG. 16, and is almost equal to the threshold voltage VT1 shown in FIGS. 14A to 14C.

Note that the configuration of the waveform adjusting circuit 32 is not limited to the configuration shown in FIG. 16. For example, the waveform adjusting circuit 32 may be formed using a comparator or the like. The configuration of the enable signal generation circuit 120 is not limited to the configuration shown in FIG. 16. For example, the enable signal generation circuit 120 may be formed using a logic circuit such as a NOR circuit or a NAND circuit. The configuration of the output circuit 126 is not limited to the configuration shown in FIG. 16. For example, the output circuit 126 may be formed using an averaging circuit that calculates the average value (moving average) of a plurality of count values (e.g., the current count value and the preceding count value).

5. Second Configuration Example of Power Transmission Device

Figure 18:
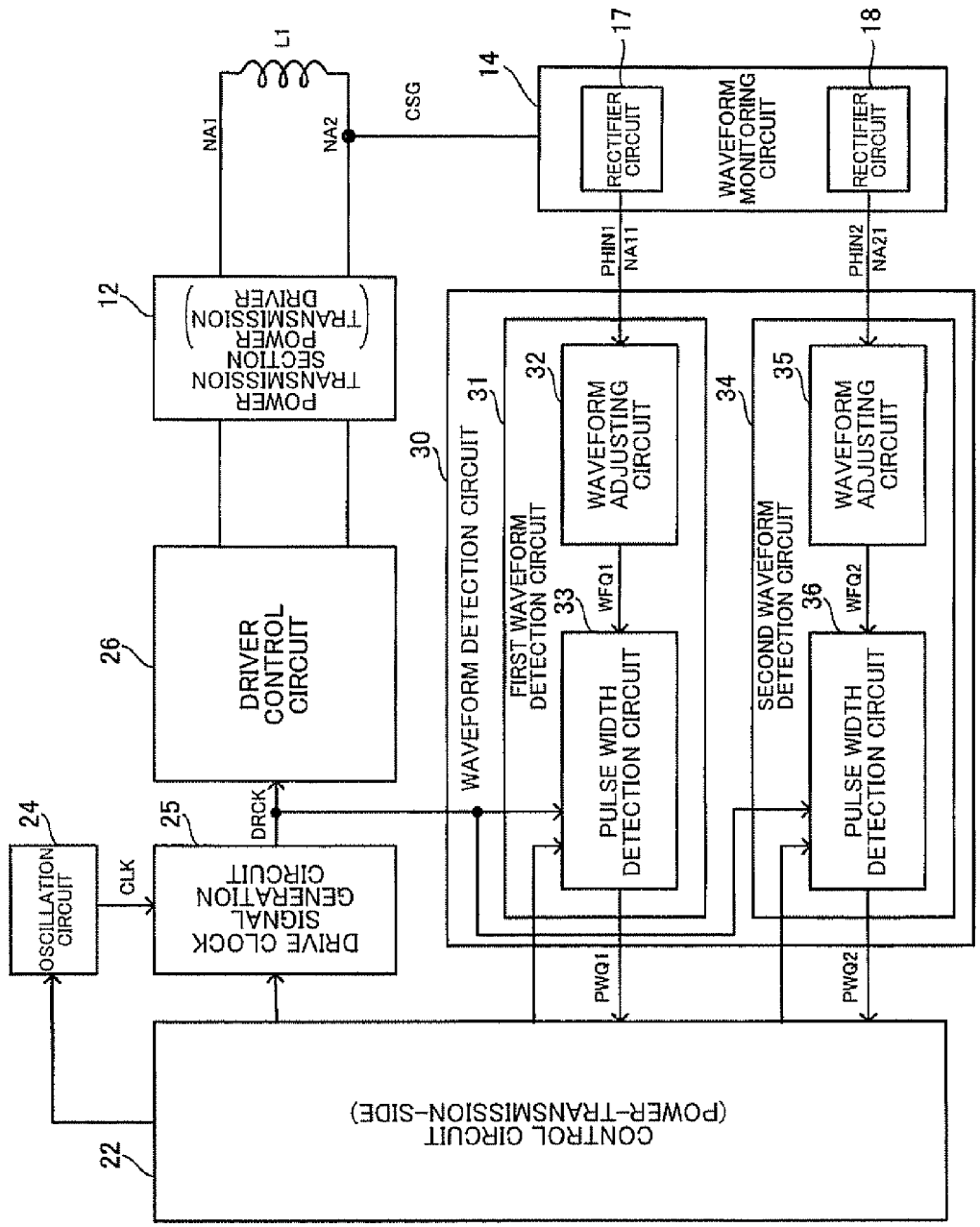
FIG. 18 shows a second configuration example of a power transmission device according to one embodiment of the invention.

FIG. 18 shows a second configuration example of the power transmission device 10. FIG. 18 corresponds to the fourth configuration example of the waveform monitoring circuit 14 shown in FIG. 8. The power transmission device 10 may be configured so that the waveform monitoring circuit 14 of the power transmission device shown in FIG. 18 corresponds to the fifth configuration example shown in FIG. 11.

In FIG. 18, the waveform detection circuit 30 includes the second waveform detection circuit 34 that detects a change in waveform of the second induced voltage signal PHIN2 of the primary coil L1 in addition to the first waveform detection circuit 31 described with reference to FIGS. 13 and 16. The first waveform detection circuit 31 detects the pulse width using the first pulse width detection method described with reference to FIGS. 14A to 14C and the like. On the other hand, the second waveform detection circuit 34 detects the pulse width using the second pulse width detection method described later with reference to FIGS. 19A to 19C.

The second waveform detection circuit 34 includes a second waveform adjusting circuit 35 and a second pulse width detection circuit 36. The waveform adjusting circuit 35 adjusts the waveform of the induced voltage signal PHIN2 of the primary coil L1, and outputs a waveform-adjusted signal WFQ2. Specifically, the waveform adjusting circuit 35 outputs the square wave (rectangular wave) waveform-adjusted signal WFQ1 that becomes active (e.g., H level) when the signal PHIN2 has exceeded a given threshold voltage, for example.

The pulse width detection circuit 36 detects pulse width information relating to the induced voltage signal PHIN2 of the primary coil L1. Specifically, the pulse width detection circuit 36 receives the waveform-adjusted signal WFQ2 from the waveform adjusting circuit 35 and the drive clock signal DRCK from the drive clock signal generation circuit 25, and detects the pulse width information relating to the waveform-adjusted signal WFQ2 to detect the pulse width information relating to the induced voltage signal PHIN2.

For example, a timing at which the induced voltage signal PHIN2 that has changed from the high-potential-side power supply voltage (VDD) has become lower than the second threshold voltage VT2 is referred to as a second timing. In this case, the pulse width detection circuit 36 measures a second pulse width period that is a period between a second edge timing (e.g., rising edge timing) of the drive clock signal DRCK and the second timing to detect second pulse width information. For example, the pulse width detection circuit 36 measures the second pulse width period in which the voltage signal PHIN2 induced by a change in voltage of the drive clock signal DRCK becomes equal to or higher than the given threshold voltage VT2. The pulse width detection circuit 36 measures the pulse width of the waveform-adjusted signal WFQ2 (induced voltage signal) with respect to the pulse width of the drive clock signal DRCK. In this case, the pulse width detection circuit 36 measures the pulse width period using the reference clock signal CLK, for example. A latch circuit (not shown) latches measurement result data PWQ2 obtained by the pulse width detection circuit 36, for example. Specifically, the pulse width detection circuit 36 measures the pulse width period using a counter that increments (or decrements) the count value based on the reference clock signal CLK, and the latch circuit latches the measurement result data PWQ2.

The control circuit 22 performs foreign object detection (secondary foreign object detection) based on the pulse width information detected by the pulse width detection circuit 36. Alternatively, the control circuit 22 detects data transmitted from the power reception device 40 by means of load modulation.

FIGS. 19A to 19C show measurement results for the signal waveforms of the drive clock signal DRCK, the coil end signal CSG, the induced voltage signal PHIN2, and the pulse signal PLS2. FIGS. 19A, 19B, and 19C show signal waveforms in a low-load state, a medium-load state, and a high-load state, respectively. The pulse signal PLS2 used for pulse width detection is a signal that is set at the H level at a second timing TM2 at which the induced voltage signal PHIN2 becomes lower than the second threshold voltage VT2, and is set at the L level at a falling edge timing TF of the drive clock signal DRCK. As the threshold voltage VT2 (e.g., a threshold voltage of an N-type transistor) used to measure the pulse width period, a voltage at which the load state detection accuracy is optimized may be appropriately selected.

As shown in FIGS. 19A to 19C, the pulse width period XTPW2 of the pulse signal PLS2 increases as the power-reception-side load increases. Therefore, the power-reception-side load state can be detected by measuring the pulse width period XTPW2. Specifically, a foreign object can be detected (secondary foreign object detection), or whether data (save frame) transmitted from the power-reception-side instrument is "0" or "1" can be detected.

In FIGS. 19A to 19C, the period from the timing TM2 to the falling edge timing TF of the drive clock signal DRCK is defined as the pulse width period XTPW2. In this case, the second waveform detection circuit 34 detects the pulse width period XTPW2 of the pulse signal PLS2 as the second pulse width information. Note that it is desirable that the period from a rising edge timing TR of the drive clock signal DRCK to the timing TM2 be specified as the pulse width period TPW2 (see FIG. 23), and the second waveform detection circuit 33 detect the pulse width period TPW2 as the second pulse width information. This prevents a situation in which the pulse width period is measured while regarding a noise signal as a pulse signal when the power-reception-side load is low. In this case, the pulse width period TPW2 decreases as the power-reception-side load increases.

The second method (falling edge detection system) shown in FIGS. 19A to 19C has an advantage over the first method (rising edge detection method) shown in FIGS. 14A to 14C in that the pulse width (count value) changes to a large extent even if a change in load is small so that high sensitivity is achieved. On the other hand, the first method shown in FIGS. 14A to 14C has an advantage over the second method shown in FIGS. 19A to 19C in that a variation in pulse width detection is small with respect to a change in power supply voltage or a change in distance or positional relationship between the coils L1 and L2.

Figure 20A:
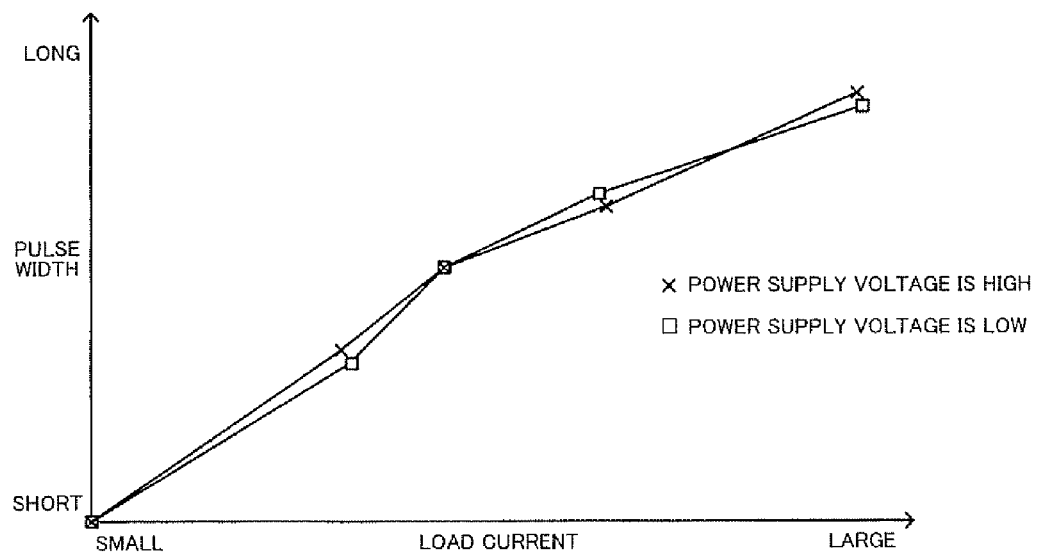
FIGS. 20A and 20B are views illustrative of a variation in pulse width detection due to a change in power supply voltage.
Figure 20B:
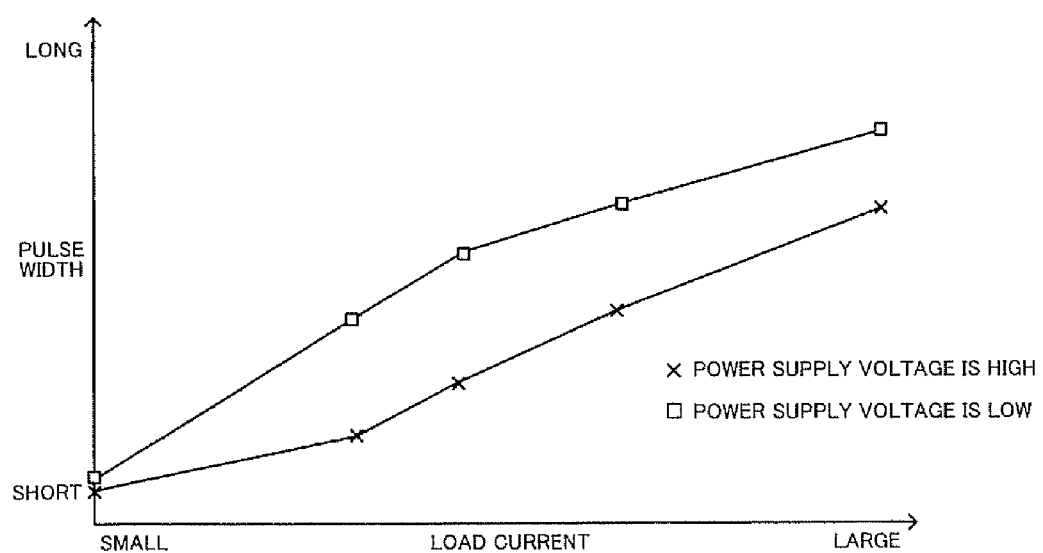

FIG. 20A is a view showing a variation in pulse width detection with respect to a change in power supply voltage when using the first method, and FIG. 20B is a view showing a variation in pulse width detection with respect to a change in power supply voltage when using the second method.

As shown in FIG. 20A, the load current-pulse width characteristic curve does not change to a large extent when using the first method even if the power supply voltage has increased or decreased. As shown in FIG. 20B, when using the second method, the load current-pulse width characteristic curve changes when the power supply voltage has increased or decreased (i.e., a variation in pulse width detection with respect to a change in power supply voltage is large).

In the second configuration shown in FIG. 18, the first waveform detection circuit 31 detects the waveform using the first method and the resulting first pulse width information (PWQ1) is used during primary foreign object detection (i.e., foreign object detection before normal power transmission starts). The second waveform detection circuit 34 detects the waveform using the second method and the resulting second pulse width information (PWQ2) is used during secondary foreign object detection (i.e., foreign object detection after normal power transmission has started). Data (data that indicates full-charge detection or the like) transmitted from the power-reception-side instrument is also detected using the second pulse width information, for example.

Figure 21:
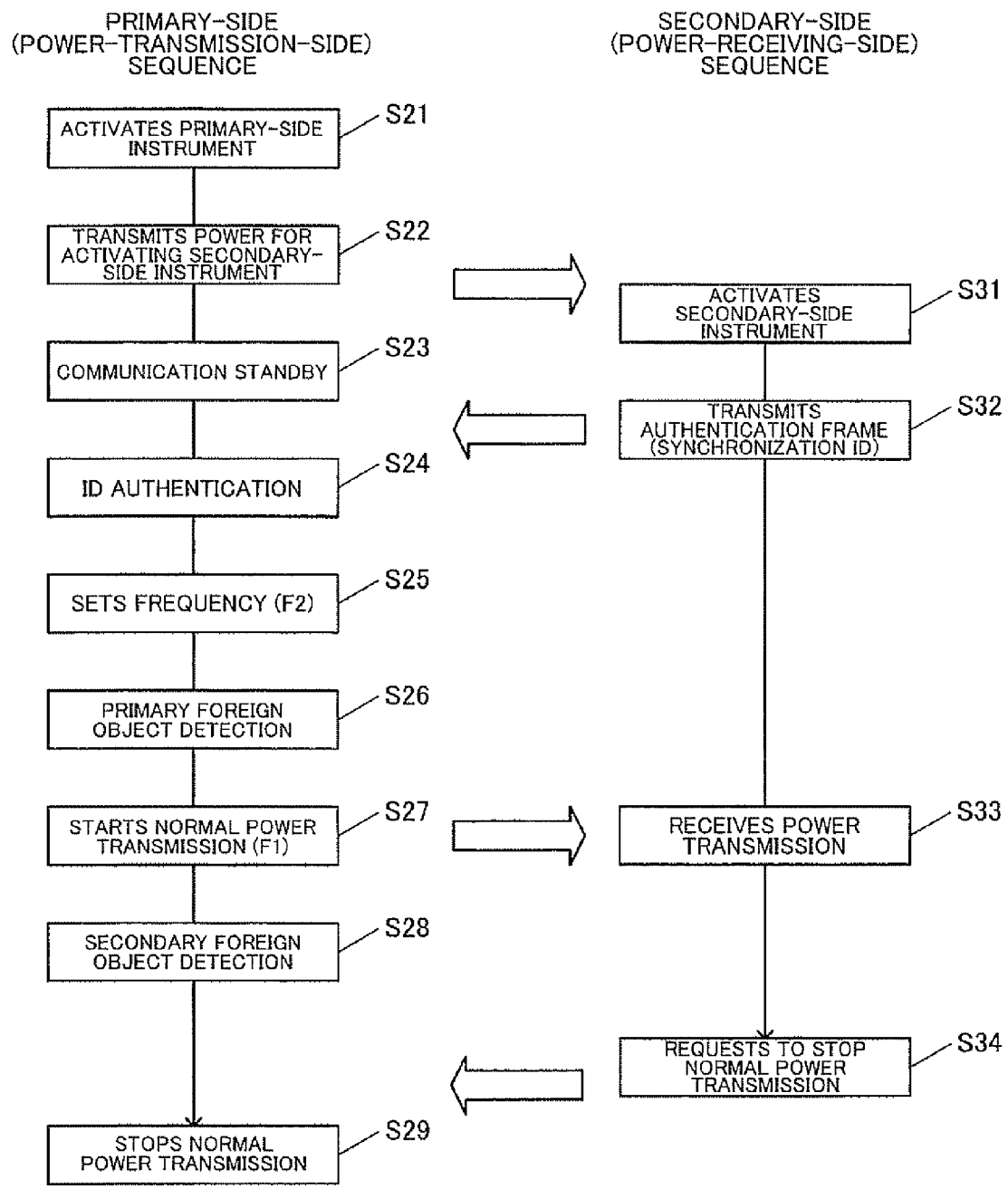
FIG. 21 is a flowchart illustrative of primary foreign object detection and secondary foreign object detection.

FIG. 21 is a flowchart illustrative of primary foreign object detection and secondary foreign object detection.

The primary-side instrument (power transmission device) is activated (step S21). The activated primary-side instrument transmits power (power for position detection) for activating the secondary-side instrument (step S22), and transitions to a communication standby state (step S23). The secondary-side instrument (power reception device) is then activated (step S31), and transmits an authentication frame (synchronization ID) to the primary-side instrument by means of load modulation described with reference to FIG. 3B (step S32).

When the primary-side instrument has received the authentication frame, the primary-side instrument performs ID authentication (step S24). The primary-side instrument then sets the drive frequency (frequency of the drive clock signal DRCK) at a foreign object detection frequency F2 differing from a normal power transmission frequency F1. Specifically, the primary-side instrument then sets the drive frequency at the foreign object detection frequency F2 that is a frequency between the normal power transmission frequency F1 and a coil resonance frequency F0.

The primary-side instrument performs primary foreign object detection in a state in which the drive frequency is set at the foreign object detection frequency F2 (step S26). Specifically, the primary-side instrument performs primary foreign object detection by causing the first waveform detection circuit 31 to detect the waveform using the first method described with reference to FIGS. 14A to 14C.

The primary-side instrument then sets the drive frequency at the normal power transmission frequency F1, and starts normal power transmission (step S27). The secondary-side instrument receives power transmitted from the primary-side instrument (step S33).

After normal power transmission has stared, the secondary-side instrument performs secondary foreign object detection (step S28). Specifically, the primary-side instrument performs secondary foreign object detection by causing the second waveform detection circuit 34 to detect the waveform using the second method described with reference to FIGS. 19A to 19C. In this case, it is desirable that the secondary-side instrument regularly perform secondary foreign object detection after normal power transmission has started.

When the secondary-side instrument has detected that the load has been fully charged, the secondary-side instrument requests the primary-side instrument to stop normal power transmission (step S34). The primary-side instrument then stops normal power transmission (step S29).

In FIG. 21, primary foreign object detection is performed in a no-load state before normal power transmission starts, for example. Primary foreign object detection is performed using the first method that reduces a variation with respect to a change in power supply voltage or the like (see FIG. 20A). Therefore, a foreign object can be stably detected even if a change in power supply voltage or the like has occurred. Moreover, the pulse width count value obtained by primary foreign object detection can be set as a reference value. Secondary foreign object detection after normal power transmission can be performed, or whether data transmitted from the power-reception-side instrument is "0" or "1" can be detected, based on the reference value in a no-load state, whereby a change in load can be efficiently detected.

Figure 22:
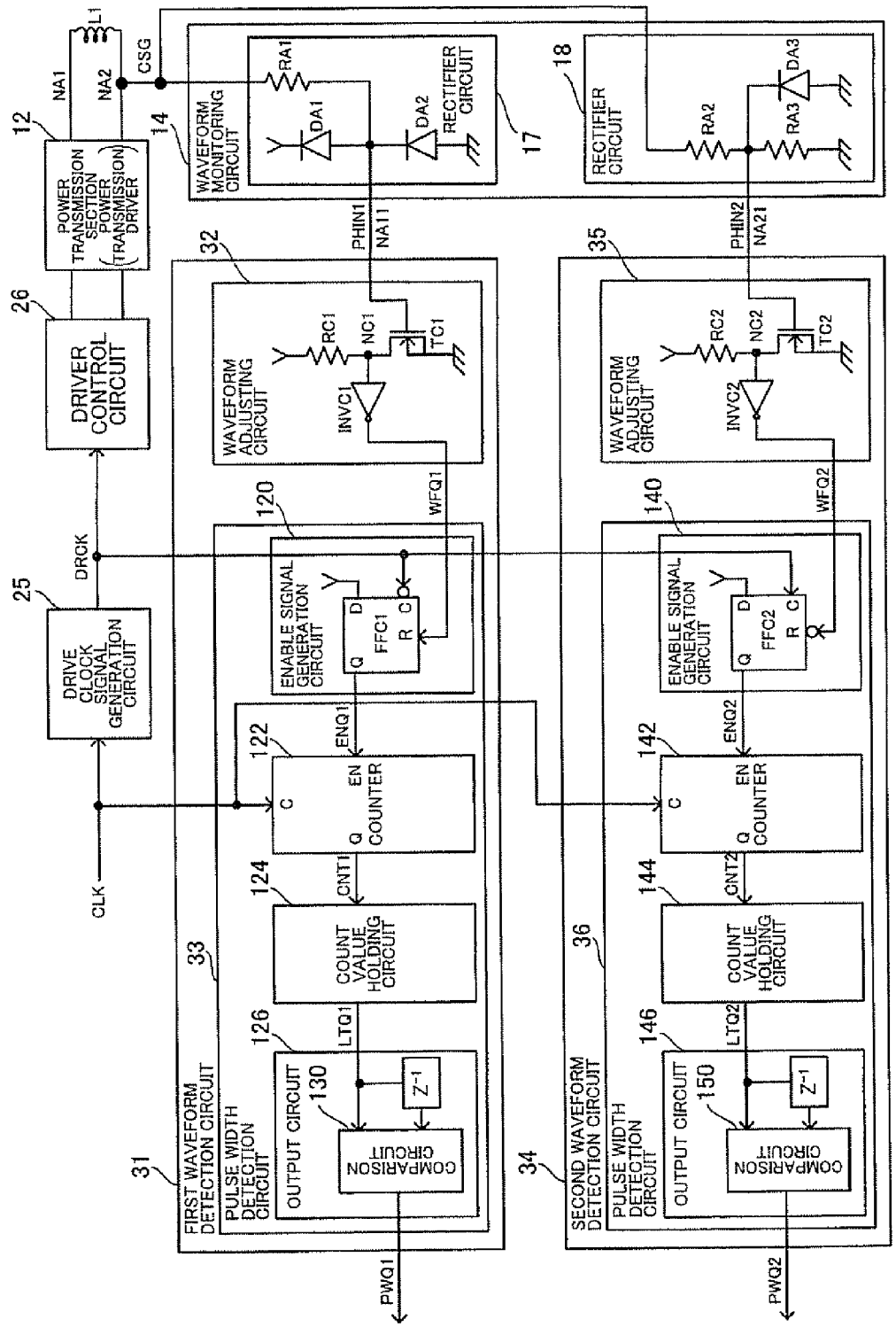
FIG. 22 shows a specific example of a second configuration example of a power transmission device.

FIG. 22 shows a specific example of the second configuration example of the power transmission device 10 according to this embodiment. In FIG. 22, the waveform adjusting circuit 35 of the second waveform detection circuit 34 has a configuration similar to that of the waveform adjusting circuit 32 of the first waveform detection circuit 31. An enable signal generation circuit 140 of the second waveform detection circuit 34 is configured so that the drive clock signal DRCK is input to a non-inverting clock terminal of a flip-flop circuit FFC2, and the waveform-adjusted signal WFQ2 is input to an inverting reset terminal of the flip-flop circuit FFC2. The configurations of a counter 142, a count value holding circuit 144, and an output circuit 146 of the second waveform detection circuit 34 are the same as the configurations of the counter 122, the count value holding circuit 124, and the output circuit 126 of the first waveform detection circuit 31.

Figure 23:
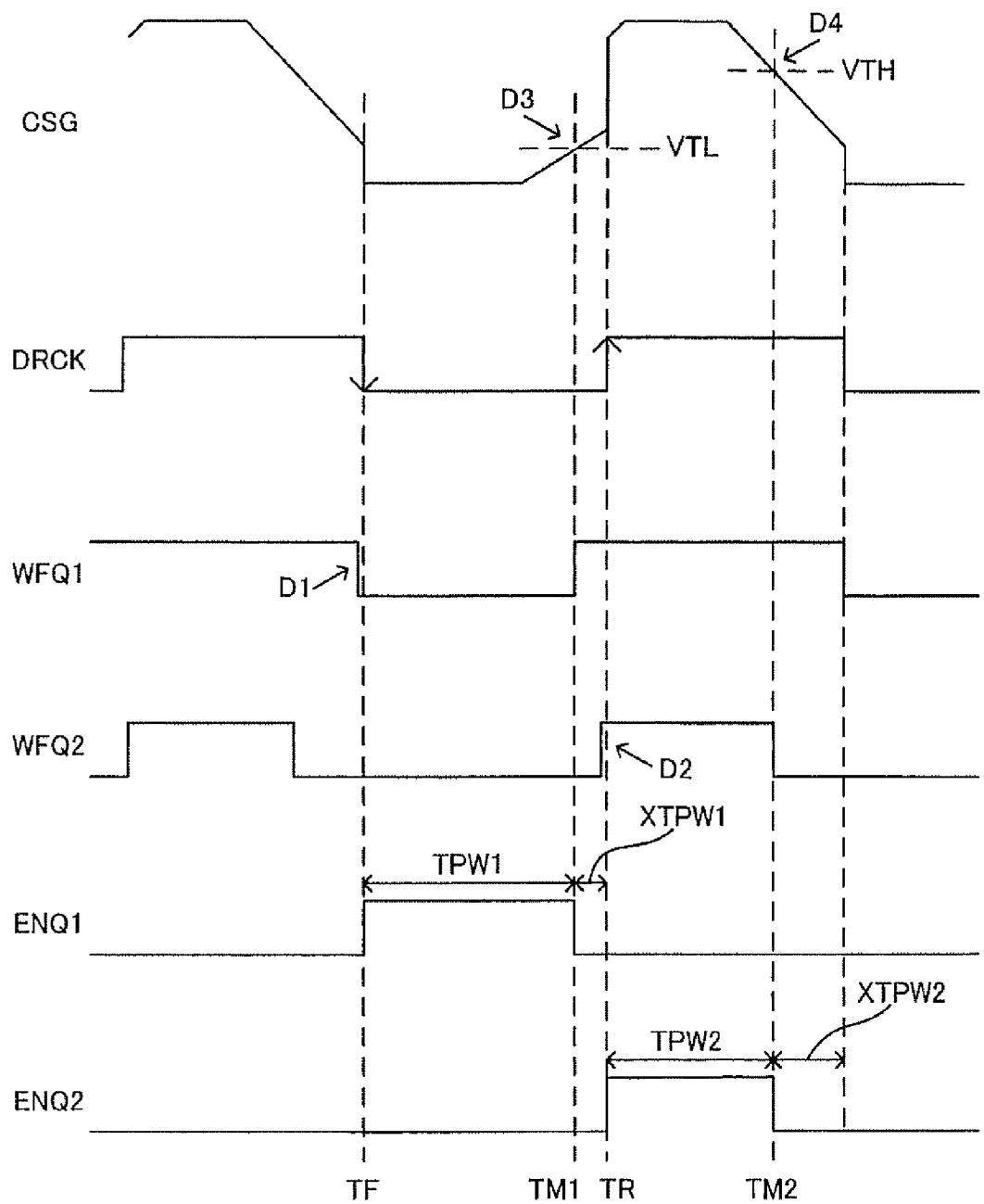
FIG. 23 shows a signal waveform example illustrative of the operation of a second configuration example of a power transmission device.

FIG. 23 shows a signal waveform example illustrative of the operation of the circuit shown in FIG. 22. When the waveform-adjusted signal WFQ2 is set at the H level at a timing indicated by D2 in FIG. 23, the reset state of the flip-flop circuit FFC2 is canceled. The voltage VDD is input to the flip-flop circuit FFC2 at the rising edge timing TR of the drive clock signal DRCK, whereby the enable signal ENQ2 changes from the L level to the H level. This causes the counter 142 to start the count process and measure the pulse width period TPW2 using the reference clock signal CLK.

When the waveform-adjusted signal WFQ2 is set at the L level at the second timing TM2, the flip-flop circuit FFC2 is reset so that the enable signal ENQ2 changes from the L1 level to the L level. This causes the counter 142 to stop the count process. The count value obtained by the count process is the measurement result that indicates the pulse width period TPW2.

As shown in FIG. 23, the sum of the pulse width periods TPW2 and XTPW2 corresponds to the half-cycle period of the drive clock signal DRCK. The pulse width period XTPW2 shown in FIGS. 19A to 19C increases as the power-reception-side load increases. Therefore, the pulse width period TPW2 shown in FIG. 23 decreases as the power-reception-side load increases. In the pulse width period XTPW2 shown in FIGS. 19A to 19C, it is difficult to distinguish a noise signal from a pulse signal when the power-reception-side load is low. Such a problem can be prevented using the pulse width period TPW2 shown in FIG. 23.

The timing TM1 is determined using a low-potential-side threshold voltage VTL (see D3 in FIG. 23) when using the first method, and the timing TM2 is determined using a high-potential-side threshold voltage VTH (see D4) when using the second method.

When the rectifier circuit 18 for the second method (see FIG. 22) is used when using the first method that determines the timing TM1 using the low-potential-side threshold voltage VTL (see D3 in FIG. 23), the waveform may be deformed due to voltage division using the resistors RA2 and RA3, whereby the detection accuracy may deteriorate.

The rectifier circuit 17 used for the first method shown in FIG. 22 can input the signal PHIN1 obtained by subjecting the coil end signal CSG to the clamp operation and half-wave rectification to the first waveform monitoring circuit 31 without performing voltage division using a resistor. Therefore, the pulse width can be detected based on the signal PHIN1 that has a fine waveform (i.e., is not subjected to voltage division using a resistor). As a result, the detection accuracy can be improved. Moreover, a situation in which the signal PHIN1 exceeds the maximum rated voltage or a negative voltage is input to the first waveform detection circuit 31 can be prevented by providing the diodes DA1 and DA2.

On the other hand, the rectifier circuit 18 used for the second method outputs the signal PHIN2 of which the voltage has been divided by the resistors RA2 and RA3 to an N-type transistor TC2 of the waveform adjusting circuit 35. A situation in which the signal PHIN2 exceeds the maximum rated voltage can be prevented by dividing the voltage of the signal PHIN2. Moreover, the high-potential-side threshold voltage VTH can be set, as indicated by D4 in FIG. 23. Specifically, the signals PHIN1 and PHIN2 are respectively input to the gates of the N-type transistors TC1 and TC2 having the same threshold voltage. However, since the signal PHIN2 is obtained by voltage division using the resistors RA2 and RA3, the threshold voltage VTH indicated by D4 is higher than the threshold voltage VTL indicated by D3 with respect to the coil end signal CSG. A chance in pulse width with respect to a change in load increases by setting the threshold voltage VTH at such a high voltage, whereby a change in load can be detected with high sensitivity. Therefore, secondary foreign object detection after normal power transmission has started or determination of whether data transmitted from the secondary-side instrument is "1" or "0" can be appropriately performed.

In FIG. 22, the first rectifier circuit 17 for the first pulse width detection method and the second rectifier circuit 18 for the second pulse width detection method are provided. Note that a third rectifier circuit for peak detection (voltage detection) may also be provided. A third waveform detection circuit that receives a third induced voltage signal from the third rectifier circuit for peak detection may be provided in addition to the first waveform detection circuit and the second waveform detection circuit. In this case, the third waveform detection circuit detects a change in power-reception-side load by detecting a change in the peak of the third induced voltage signal. The third waveform detection circuit may include an amplitude detection circuit that performs a peak-hold operation, and an A/D conversion circuit that subjects a signal of which the peak has been held by the amplitude detection circuit to A/D conversion, and the like. More intelligent waveform detection can be implemented by providing the third rectifier circuit and the third waveform detection circuit for amplitude detection to combine peak detection and pulse width detection.

Figure 24:
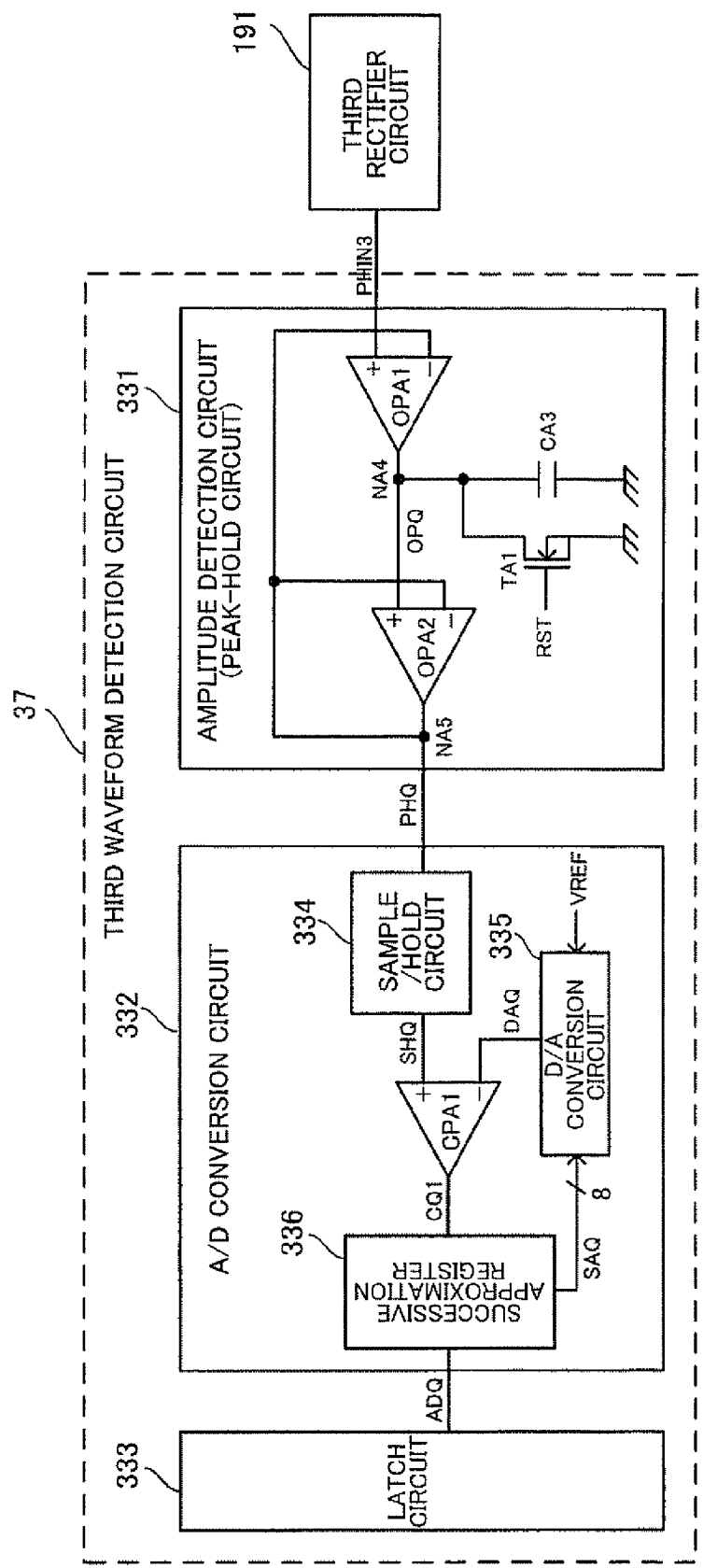
FIG. 24 shows a specific configuration example of a third waveform detection circuit included in a waveform detection circuit.

FIG. 24 shows a specific configuration example of the third waveform detection circuit 37 included in the waveform detection circuit 30 according to the fifth configuration example shown in FIG. 11.

As shown in FIG. 24, the third waveform detection circuit 37 includes an amplitude detection circuit 331, an A/D conversion circuit 332, and a latch circuit 333. The amplitude detection circuit 331 includes operational amplifiers OPA1 and OPA2, a hold capacitor CA3, and a reset N-type transistor TA1. A signal PHIN3 is input to a non-inverting input terminal of the operational amplifier OPA1, and an output node NA5 of the operational amplifier OPA2 is connected to an inverting input terminal of the operational amplifier OPA1. The hold capacitor CA3 and the reset transistor TA1 are provided between a peak voltage hold node NA4 (i.e., output node of the operational amplifier OPA1) and the power supply GND (low-potential-side power supply). The hold node NA4 is connected to a non-inverting input terminal of the operational amplifier OPA2, and the output node NA5 of the operational amplifier OPA2 is connected to an inverting input terminal of the operational amplifier OPA2 so that the operational amplifier OPA2 forms a voltage-follower-connected operational amplifier. A voltage-follower-connected operational amplifier may be further provided in the subsequent stage of the operational amplifier OPA2.

The operational amplifiers OPA1 and OPA2, the hold capacitor CA3, and the reset transistor TA1 shown in FIG. 24 form a peak-hold circuit (peak detection circuit). Specifically, the peak voltage of the signal PHIN3 from the third rectifier circuit 191 of the waveform monitoring circuit 14 is held by the hold node NA4, and the peak voltage signal held by the hold node NA4 is subjected to impedance conversion by the voltage-follower-connected operational amplifier OPA2 and is output to the node NA5.

The reset transistor TA1 is turned ON in a reset period to discharge the hold node NA4 toward the power supply GND. Specifically, the operational amplifier OPA1 is an operational amplifier that merely stores a charge in the hold capacitor CA3, but cannot discharge a charge toward the power supply GND. Therefore, the operational amplifier OPA1 can follow an increase in the peak voltage of the signal PHIN3, but cannot follow a decrease in the peak voltage of the signal PHIN3. A leakage current exists in a charge-storage P-type transistor provided in an output section of the operational amplifier OPA1. Therefore, even if the P-type transistor is turned OFF, the voltage of the hold node NA4 increases with the passage of time. Accordingly, it is necessary to regularly reset the voltage of the hold node NA4. In FIG. 24, the reset transistor TA1 is provided for the hold node NA4 for the above reasons.

In this embodiment, the power-reception-side instrument detects (extracts) a clock signal from the power-transmission-side alternating-current voltage, and performs load modulation in synchronization with the clock signal, for example. Therefore, since the power-reception-side instrument performs load modulation in synchronization with the power-transmission-side clock signal, the power-transmission-side instrument can uniquely determine the power-reception-side load modulation timing. Therefore, the control circuit 22 specifies the load switch timing of the power-reception-side load modulation, and performs reset control which discharges the hold node NA4 toward the power supply GND in a reset period including the specified switch timing. This implements an appropriate peak-hold operation even when employing the operational amplifier OPA1 that cannot follow a decrease in peak voltage. Moreover, an increase in the held voltage due to a leakage current of the P-type transistor of the operational amplifier OPA1 can be prevented by regularly resetting the voltage of the hold node NA4 in a standby mode when waiting for the peak voltage to exceed a provisional voltage SIGH0.

Figure 25:
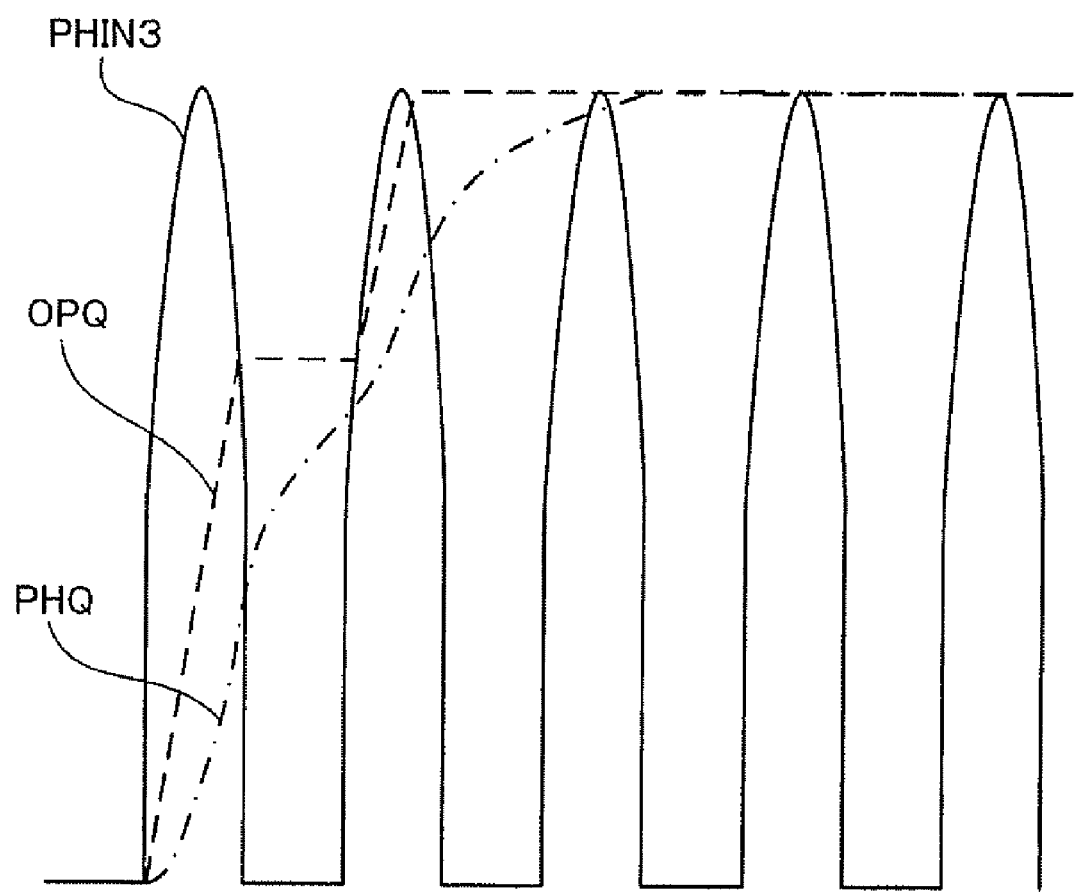
FIG. 25 shows a signal waveform example illustrative of the operation of an amplitude detection circuit of the third waveform detection circuit.

FIG. 25 shows a signal waveform example illustrative of the operation of the amplitude detection circuit 331. As shown in FIG. 25, the signal PHIN3 is a signal that is half-wave rectified by the third rectifier circuit 191 that is a half-wave rectifier circuit. The voltage of an output signal OPQ from the operational amplifier OPA1 increases in a pulse generation period of the signal PHIN3. The voltage of the output signal OPQ is held by the hold capacitor CA3 and is maintained in a pulse non-generation period. An output signal PHQ from the operational amplifier OPA2 smoothly follows the peak of the signal PHIN.

The A/D conversion circuit 332 includes a sample/hold circuit 334, a comparator CPA1, a successive approximation register 336, and a D/A conversion circuit 335. The sample/hold circuit 334 samples and holds the signal PHQ. The comparator CPA1 compares a D/A-converted analog signal DAQ from the D/A conversion circuit 335 with a sample/hold signal SHQ from the sample/hold circuit 334. The successive approximation register 336 (successive approximation type control circuit) stores data relating to an output signal CQ1 from the comparator CPA1. The D/A conversion circuit 335 subjects digital data SAQ (e.g., eight bits) from the successive approximation register 336 to D/A conversion, and outputs the analog signal DAQ.

In the successive approximation A/D conversion circuit 332, the comparator CPA1 compares the D/A-converted signal DAQ when only the most significant bit (MSB) is set at "1" with the input signal SHQ (PHQ). When the voltage of the signal SHQ is higher than the voltage of the signal DAQ, the comparator CPA1 maintains the MSB at "1". When the voltage of the signal SHQ is lower than the voltage of the signal DAQ, the comparator CPA1 sets the MSB at "0". The A/D conversion circuit 332 performs the successive approximation process on the lower-order bits in the same manner as described above. The A/D conversion circuit 208 outputs the resulting digital data ADQ to the latch circuit 333. Note that the A/D conversion circuit 332 is not limited to the configuration shown in FIG. 24. For example, the A/D conversion circuit 29 may be a successive approximation type A/D conversion circuit having a different circuit configuration, or may be a servo-balancing type, parallel comparison type, or dual-slope type A/D conversion circuit.

For example, removal detection (detachment detection) that detects that the portable telephone 510 shown in FIG. 1A has been removed from the charger 500 can be implemented by using the third waveform detection circuit 37 having the configuration shown in FIG. 24. Specifically, when the portable telephone 510 has been removed from the charger 500, the amplitude of the coil end signal CSG changes, as is clear from FIG. 3B. In FIG. 24, the amplitude detection circuit 331 detects the amplitude (peak voltage) of the coil end signal CSG, and the A/D conversion circuit 332 converts the detected amplitude into a digital value. The control circuit 22 compares the digital value corresponding to the amplitude (peak voltage) obtained and a digital value corresponding to a threshold voltage to detect a change in the amplitude of the coil end signal CSG shown in FIG. 3B, thereby detecting that the portable telephone 510 has been removed from the charger 500.

The first waveform detection circuit 31 shown in FIG. 11 performs primary foreign object detection (step S26 in FIG. 21) before normal power transmission starts using the first waveform detection method (rising edge detection method).

The second waveform detection circuit 34 shown in FIG. 11 performs secondary foreign object detection (step S28 in FIG. 21) after normal power transmission has started, or detects data transmitted from the power-reception-side instrument using the second waveform detection method (falling edge detection method).

In FIG. 11, the first waveform detection circuit 31 performs primary foreign object detection, the second waveform detection circuit 34 performs secondary foreign object detection or data detection, and the third waveform detection circuit 37 performs removal detection, as described above. More intelligent waveform detection can be implemented by selectively utilizing the waveform detection circuits.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., GND, VDD, and portable telephone/charger) cited with a different term (e.g. low-potential-side power supply, high-potential-side power supply, and electronic instrument) having a broader meaning or the same meaning at least once in the specification and the drawings can be replaced by the different term in any place in the specification and the drawings. The invention also includes any combinations of the embodiments and the modifications. The configurations and the operations of the power transmission control device, the power transmission device, the power reception control device, and the power reception device, and the pulse width detection method are not limited to those described relating to the above embodiments. Various modifications and variations may be made.

What is claimed is:

1. A power transmission device included in a non-contact power transmission system that transmits power to a power reception device by electromagnetically coupling a primary coil and a secondary coil to transmit power to a load of the power reception device, the power transmission device comprising:

a waveform monitoring circuit that includes a first rectifier circuit and generates and outputs a waveform-monitoring induced voltage signal based on a coil end signal of the primary coil; and a power transmission control device that controls a power transmission driver that drives the primary coil, the power transmission control device receiving the waveform-monitoring induced voltage signal and detecting a waveform of the induced voltage signal to detect a power-reception-side load state, the first rectifier circuit including:

a first resistor that is a current-limiting resistor provided between a coil end node where the coil end signal of the primary coil is generated and a first monitoring node where a first induced voltage signal that is the waveform-monitoring induced voltage signal is generated;

a first diode provided between the first monitoring node and a high-potential-side power supply node, a forward direction of the first diode being a direction from the first monitoring node to the high-potential-side power supply node; and a second diode provided between the first monitoring node and a low-potential-side power supply node, a forward direction of the second diode being a direction from the low-potential-side power supply node to the first monitoring node.

2. The power transmission device as defined in claim 1, the power transmission control device including a waveform detection circuit that detects a change in waveform of the induced voltage signal of the primary coil;

the waveform detection circuit including:

a first waveform detection circuit that detects a waveform of the first induced voltage signal of the primary coil; and a second waveform detection circuit that detects a waveform of a second induced voltage signal of the primary coil; and the waveform monitoring circuit including:

the first rectifier circuit that outputs the waveform-monitoring first induced voltage signal to the first waveform detection circuit through the first monitoring node; and a second rectifier circuit that outputs the waveform-monitoring second induced voltage signal to the second waveform detection circuit through a second monitoring node.

3. The power transmission device as defined in claim 2, the second rectifier circuit including:

a second resistor provided between the coil end node and the second monitoring node;

a third resistor provided between the second monitoring node and a low-potential-side power supply node; and a third diode provided between the second monitoring node and the low-potential-side power supply node, a forward direction of the third diode being a direction from the low-potential-side power supply node to the second monitoring node.

4. The power transmission device as defined in claim 2, the power transmission control device including:

a drive clock signal generation circuit that generates and outputs a drive clock signal that specifies a drive frequency of the primary coil;

a driver control circuit that generates a driver control signal based on the drive clock signal, and outputs the driver control signal to the power transmission driver that drives the primary coil; and a control circuit that detects the power-reception-side load state based on a detection result of the waveform detection circuit;

the first waveform detection circuit of the waveform detection circuit including a first pulse width detection circuit, when a timing at which the first induced voltage signal that has changed from a low-potential-side power supply voltage exceeds a first threshold voltage is referred to as a first timing, the first pulse width detection circuit measuring a first pulse width period to detect first pulse width information, the first pulse width period being a period between a first edge timing of the drive clock signal and the first timing; and the control circuit detecting the power-reception-side load state based on the first pulse width information.

5. The power transmission device as defined in claim 4, the first waveform detection circuit including a first waveform adjusting circuit that adjusts a waveform of the first induced voltage signal and outputs a first waveform-adjusted signal; and the first pulse width detection circuit measuring the first pulse width period based on the first waveform-adjusted signal and the drive clock signal.

6. The power transmission device as defined in claim 5, the first pulse width detection circuit including a first counter that increments or decrements a count value in the first pulse width period and measures the first pulse width period based on resulting count value of the first counter.

7. The power transmission device as defined in claim 4, the control circuit performing primary foreign object detection based on the first pulse width information, the primary foreign object detection being foreign object detection before normal power transmission starts.

8. The power transmission device as defined in claim 7, the second waveform detection circuit including a second pulse width detection circuit that measures a second pulse width period and detects second pulse width information, the second pulse width period being a period between a second edge timing of the drive clock signal and a second timing, the second timing being a timing when the second induced voltage signal of the primary coil that has changed from a high-potential-side power supply voltage falls below a second threshold voltage; and the control circuit performing secondary foreign object detection based on the second pulse width information, the secondary foreign object detection being foreign object detection after normal power transmission has started.

9. The power transmission device as defined in claim 8, the second waveform detection circuit including a second waveform adjusting circuit that adjusts a waveform of the second induced voltage signal and outputs a second waveform-adjusted signal; and the second pulse width detection circuit measuring the second pulse width period based on the second waveform-adjusted signal and the drive clock signal.

10. The power transmission device as defined in claim 9, the second pulse width detection circuit including a second counter that increments or decrements a count value in the second pulse width period and measures the second pulse width period based on resulting count value of the second counter.

11. The power transmission control device as defined in claim 9, the first waveform detection circuit including a first waveform adjusting circuit that adjusts a waveform of the first induced voltage signal and outputs a first waveform-adjusted signal to the first pulse width detection circuit; and the second waveform adjusting circuit adjusting a waveform of the second induced voltage signal differing from the first induced voltage signal, and outputting the second waveform-adjusted signal to the second pulse width detection circuit.

12. The power transmission device as defined in claim 1, the power transmission control device including a waveform detection circuit that detects a change in waveform of the induced voltage signal of the primary coil;

the waveform detection circuit including:

a first waveform detection circuit that detects a waveform of the first induced voltage signal of the primary coil; and a second waveform detection circuit that detects a waveform of a second induced voltage signal of the primary coil;

the waveform monitoring circuit including:

the first rectifier circuit that outputs the waveform-monitoring first induced voltage signal to the first waveform detection circuit through the first monitoring node; and a second rectifier circuit that outputs the waveform-monitoring second induced voltage signal to the second waveform detection circuit through a second monitoring node;

the second rectifier circuit including:

a third diode provided between the second monitoring node and the high-potential-side power supply node, a forward direction of the third diode being a direction from the second monitoring node to the high-potential-side power supply node;

a fourth diode provided between the second monitoring node and the low-potential-side power supply node, a forward direction of the fourth diode being a direction from the low-potential-side power supply node to the second monitoring node;

a second resistor provided between the third diode and the second monitoring node;

a third resistor provided between the second monitoring node and the low-potential-side power supply node; and a second capacitor provided between a high-potential-side resistor end node and the coil end node, the high-potential-side resistor end node being provided between the third diode and the second resistor.

13. The power transmission device as defined in claim 12, the power transmission control device including:
a drive clock signal generation circuit that generates and outputs a drive clock signal that specifies a drive frequency of the primary coil;
a driver control circuit that generates a driver control signal based on the drive clock signal, and outputs the driver control signal to the power transmission driver that drives the primary coil; and
a control circuit that detects the power-reception-side load state based on a detection result of the waveform detection circuit; and
the first waveform detection circuit of the waveform detection circuit including a first pulse width detection circuit, when a timing at which the first induced voltage signal that has changed from a low-potential-side power supply voltage exceeds a first threshold voltage is referred to as a first timing, the first pulse width detection circuit measuring a first pulse width period to detect first pulse width information, the first pulse width period being a period between a first edge timing of the drive clock signal and the first timing.

14. The power transmission device as defined in claim 13, the second waveform detection circuit including a second pulse width detection circuit that measures a second pulse width period and detects second pulse width information, the second pulse width period being a period between a second edge timing of the drive clock signal and a second timing, the second timing being a timing when the second induced voltage signal of the primary coil that has changed from a high-potential-side power supply voltage falls below a second threshold voltage.

15. An electronic instrument comprising the power transmission device as defined in claim 1.

16. A power transmission device included in a non-contact power transmission system that transmits power to a power reception device by electromagnetically coupling a primary coil and a secondary coil to transmit power to a load of the power reception device, the power transmission device comprising:
a waveform monitoring circuit that includes a first rectifier circuit and generates and outputs a waveform-monitoring induced voltage signal based on a coil end signal of the primary coil; and
a power transmission control device that controls a power transmission driver that drives the primary coil, the power transmission control device receiving the waveform-monitoring induced voltage signal and detecting a waveform of the induced voltage signal to detect a power-reception-side load state,
the first rectifier circuit including:
a first resistor that is a current-limiting resistor provided between a coil end node where the coil end signal of the primary coil is generated and a first monitoring node where a first induced voltage signal that is the waveform-monitoring induced voltage signal is generated; and
a Zener diode provided between the first monitoring node and a low-potential-side power supply node, a forward direction of the Zener diode being a direction from the low-potential-side power supply node to the first monitoring node.

17. A power transmission device included in a non-contact power transmission system that transmits power to a power reception device by electromagnetically coupling a primary coil and a secondary coil to transmit power to a load of the power reception device, the power transmission device comprising:
a waveform monitoring circuit that includes a first rectifier circuit and generates and outputs a waveform-monitoring induced voltage signal based on a coil end signal of the primary coil; and
a power transmission control device that controls a power transmission driver that drives the primary coil, the power transmission control device receiving the waveform-monitoring induced voltage signal and detecting a waveform of the induced voltage signal to detect a power-reception-side load state,
the first rectifier circuit including:
a first capacitor provided between a first node and a coil end node where the coil end signal of the primary coil is generated;
a first resistor that is a current-limiting resistor provided between the first node and a first monitoring node where a first induced voltage signal that is the waveform-monitoring induced voltage signal is generated;
a first diode provided between the first monitoring node and a high-potential-side power supply node, a forward direction of the first diode being a direction from the first monitoring node to the high-potential-side power supply node; and
a second diode provided between the first node and a low-potential-side power supply node, a forward direction of the second diode being a direction from the low-potential-side power supply node to the first node.

* * * * *